(12) United States Patent
Hatakeyama

(10) Patent No.: US 10,627,925 B2
(45) Date of Patent: Apr. 21, 2020

(54) WEARABLE DEVICE AND OPERATION METHOD OF EXECUTING AN ACTION ON THE SCREEN ACCORDANCE WITH FINGER TRACING ON THE SIDE EDGES OF THE TOUCH PAD

(71) Applicant: Toshiba Client Solutions CO., LTD., Koto-ku, Tokyo (JP)

(72) Inventor: Tetsuo Hatakeyama, Tokyo (JP)

(73) Assignee: Toshiba Client Solutions CO., LTD., Tokyo (JP)

( * ) Notice: Subject to any disclaimer, the term of this patent is extended or adjusted under 35 U.S.C. 154(b) by 3 days.

(21) Appl. No.: 16/011,385

(22) Filed: Jun. 18, 2018

(65) Prior Publication Data

US 2019/0235651 A1 Aug. 1, 2019

(30) Foreign Application Priority Data

Jan. 30, 2018 (JP) ................................ 2018-014029

(51) Int. Cl.
*G06F 3/02* (2006.01)
*G06F 3/0354* (2013.01)
*G06F 3/0488* (2013.01)

(52) U.S. Cl.
CPC ...... *G06F 3/03547* (2013.01); *G06F 3/04886* (2013.01); *G06F 3/02* (2013.01)

(58) Field of Classification Search
CPC .. G06F 3/013; G06F 3/03547; G06F 3/04886; G02B 27/017; G02B 27/0172; G02B 27/0179
See application file for complete search history.

(56) References Cited

U.S. PATENT DOCUMENTS

| | | | | |
|---|---|---|---|---|
| 8,203,502 | B1* | 6/2012 | Chi | G02B 27/017 345/7 |
| 9,316,830 | B1* | 4/2016 | Costa | G02B 27/017 |
| 2013/0002724 | A1* | 1/2013 | Heinrich | G06F 1/163 345/676 |
| 2013/0069787 | A1* | 3/2013 | Petrou | G02B 27/017 340/573.1 |
| 2013/0069985 | A1* | 3/2013 | Wong | G02B 27/017 345/633 |
| 2015/0022773 | A1* | 1/2015 | Kim | G02C 7/101 351/44 |

(Continued)

FOREIGN PATENT DOCUMENTS

| | | |
|---|---|---|
| JP | 2007-72633 | 3/2007 |
| JP | 2015-38645 | 2/2015 |

*Primary Examiner* — Jennifer Mehmood
*Assistant Examiner* — James S Nokham
(74) *Attorney, Agent, or Firm* — Knobbe, Martens, Olson & Bear, LLP

(57) ABSTRACT

According to one embodiment, a wearable device includes a display, a detector, and a hardware processor. The display displays a screen keyboard on a screen when an instruction is input. The detector includes a polygonal plate and detects a tracing action of a finger over a side of the polygonal plate. The hardware processor determines whether the screen keyboard is displayed on the screen when the detector detects the tracing action, and executes an action on the screen in accordance with the tracing action detected by the detector when the hardware processor determines that the screen keyboard is displayed.

17 Claims, 16 Drawing Sheets

(56) References Cited

U.S. PATENT DOCUMENTS

| | | | |
|---|---|---|---|
| 2015/0091780 A1* | 4/2015 | Lyren | G02B 27/017 345/8 |
| 2015/0130355 A1* | 5/2015 | Rains, Jr. | H05B 37/0227 315/134 |
| 2016/0004306 A1* | 1/2016 | Maltz | G06F 3/013 345/173 |

* cited by examiner

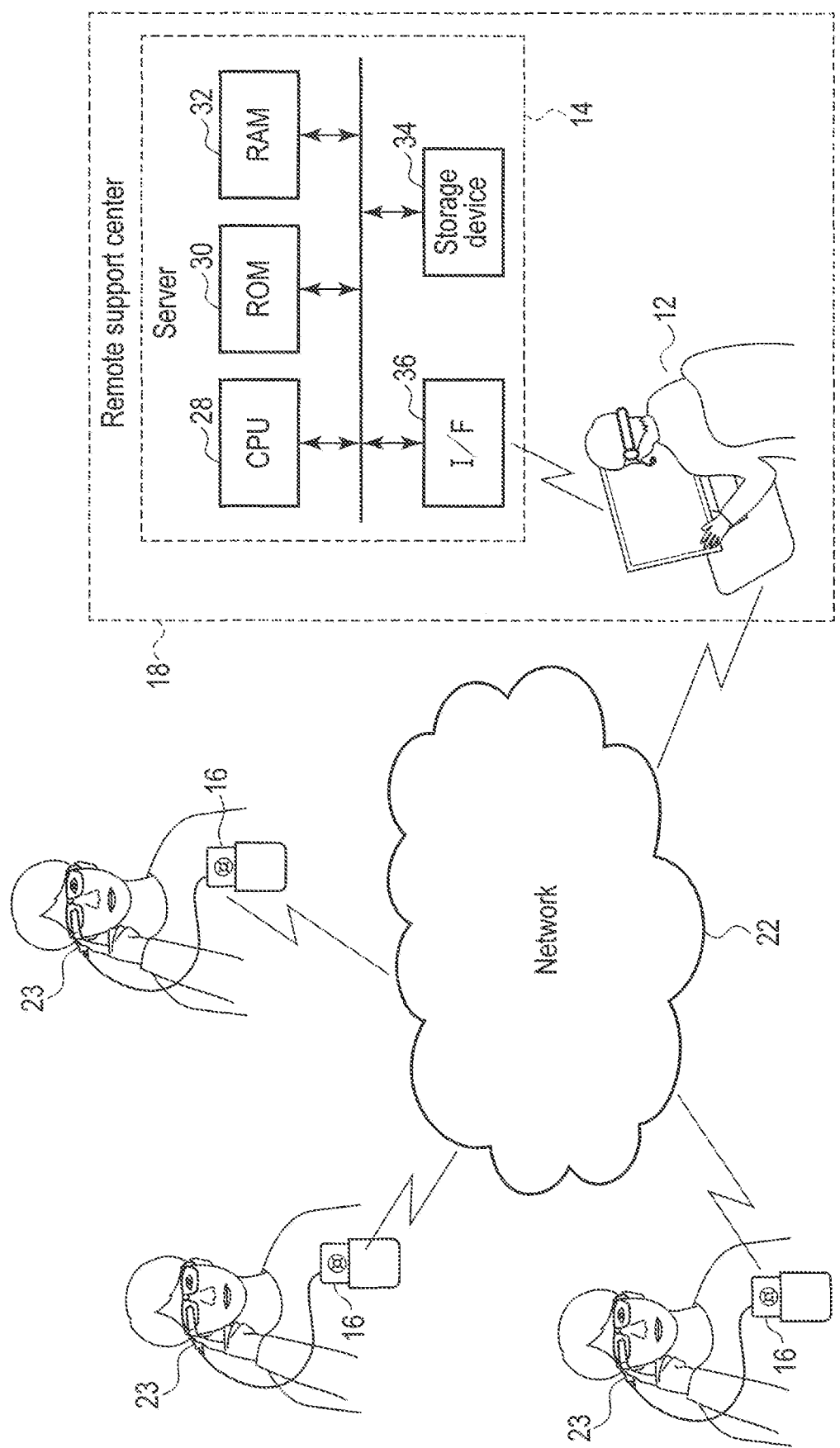
F I G. 1

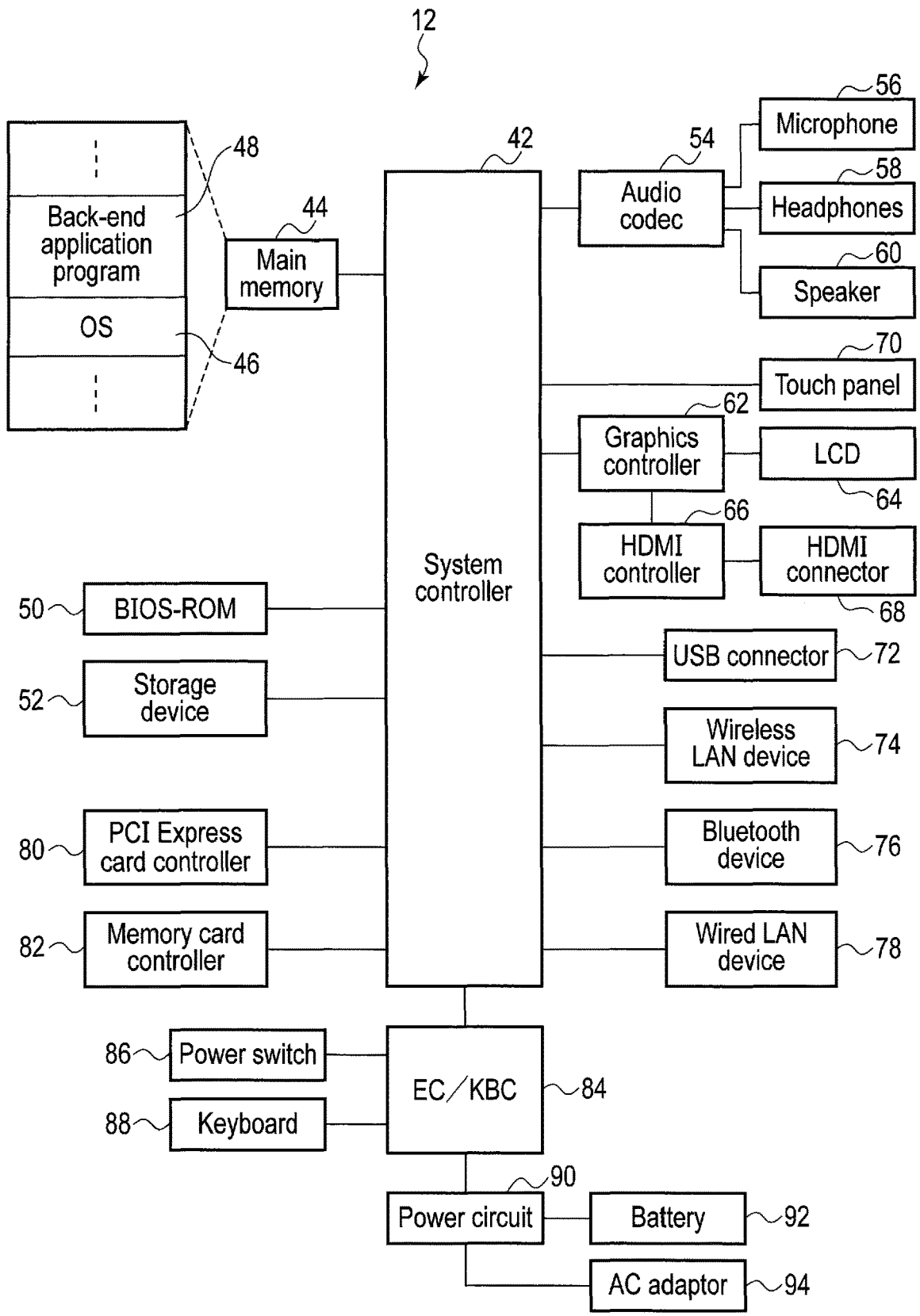
F I G. 2

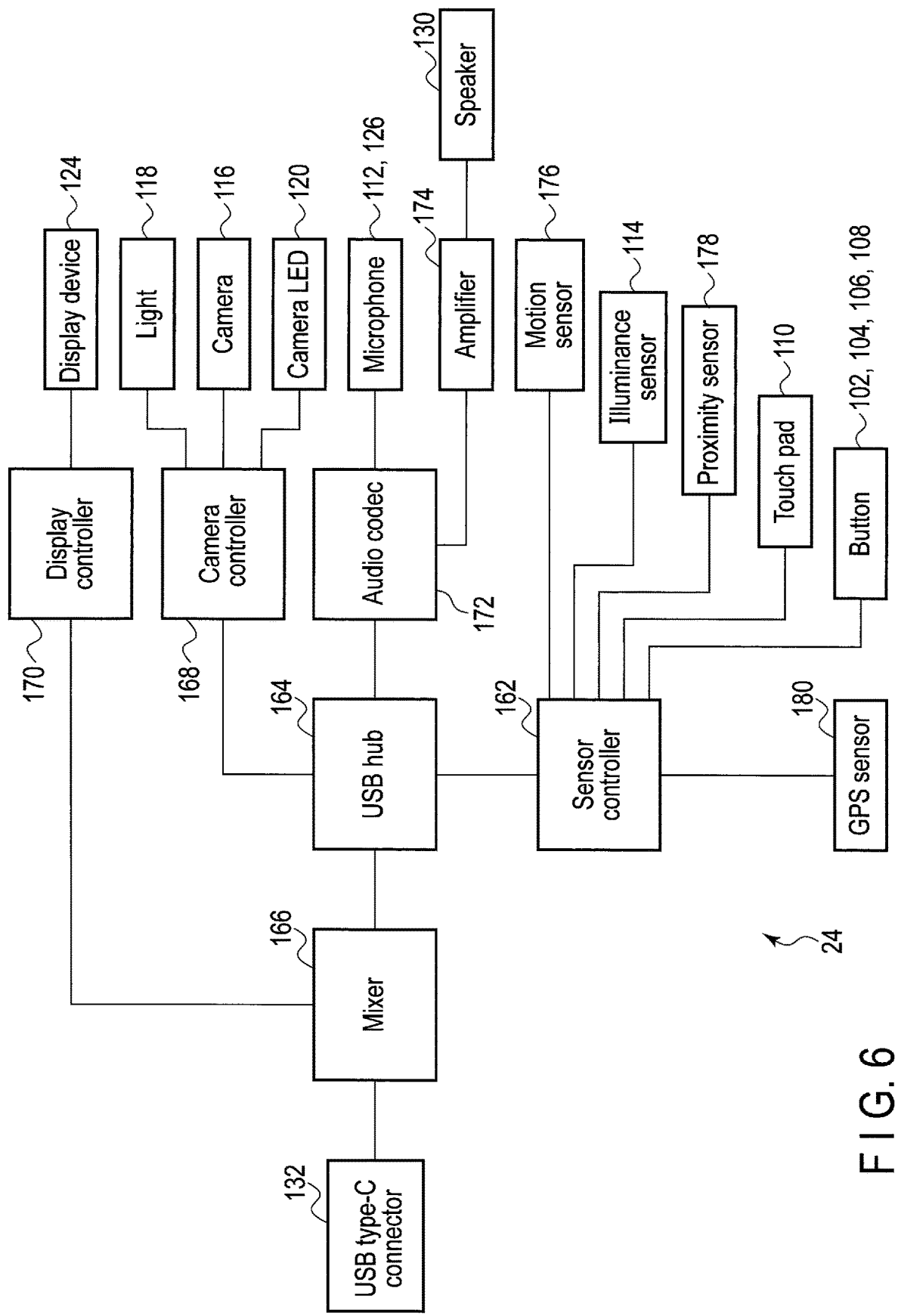
F I G. 6

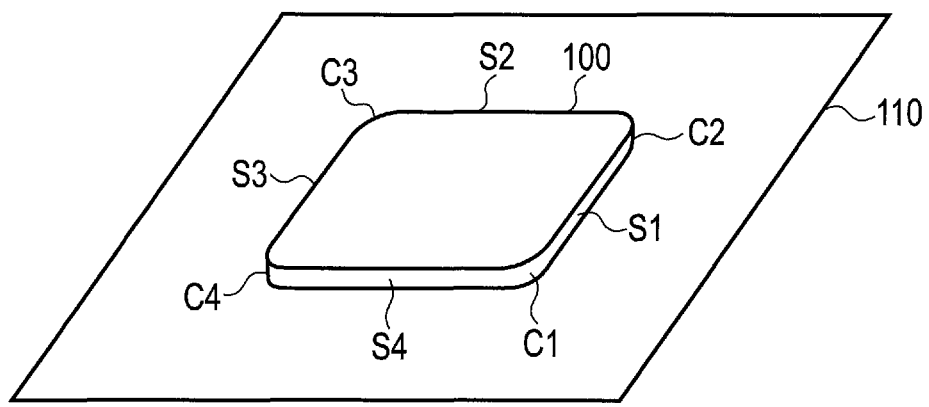
F I G. 9A
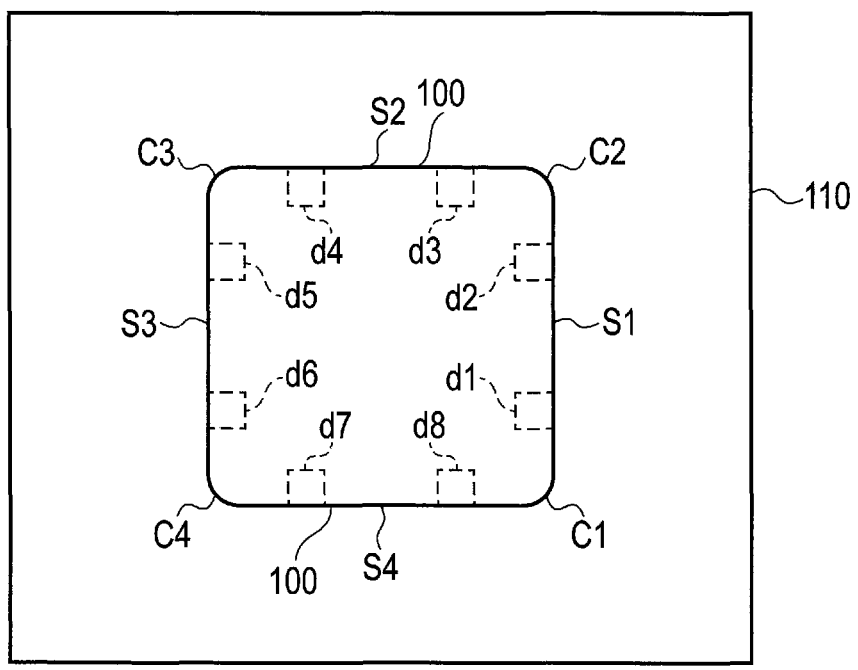
F I G. 9B

| Mouse operation | | |
|---|---|---|
| Detection order of the detectors | Gesture | Operation |
| d1 → d2 | a1 | Start/end of upward movement of the mouse cursor 504 |
| d2 → d1 | a2 | Start/end of downward movement of the mouse cursor 504 |
| d4 → d3 | a3 | Start/end of leftward movement of the mouse cursor 504 |
| d3 → d4 | a4 | Start/end of rightward movement of the mouse cursor 504 |
| d4 → d3 → d4 | b1 | Click of the mouse left button or cancellation of press-hold by the gesture b3 |
| d4 → d3 → d4 → d3 → d4 | b2 | Double-click of the mouse left button or cancellation of press-hold by the gesture b3 |
| d4 → d3 → d4 → d3 | b3 | Start of press-hold of the mouse left button or cancellation of press-hold by the gesture b3 (toggle) |
| d3 → d4 → d3 | b4 | Click of mouse right button |

FIG. 11A

| Screen keyboard operation | | |
|---|---|---|
| Detection order of the detectors | Gesture | Operation |
| d8 → d7 → d8 | c1 | Switch on/off screen keyboard display (toggle) |
| d7 → d8 → d7 | c2 | Keyboard touch input |
| d6 → d5 | d1 | Start/end of upward movement of the keyboard focus 508 |
| d5 → d6 | d2 | Start/end of downward movement of the keyboard focus 508 |
| d7 → d8 | d3 | Start/end of leftward movement of the keyboard focus 508 |
| d8 → d7 | d4 | Start/end of rightward movement of the keyboard focus 508 |
| d1 → d2 → d3 → d4 | e1 | Upward flick input of a key selected by the keyboard focus 508 |
| d4 → d3 → d2 → d1 | e2 | Downward flick input of a key selected by the keyboard focus 508 |
| d3 → d4 → d5 → d6 | e3 | Leftward flick input of a key selected by the keyboard focus 508 |
| d6 → d5 → d4 → d3 | e4 | Rightward flick input of a key selected by the keyboard focus 508 |

FIG. 11B

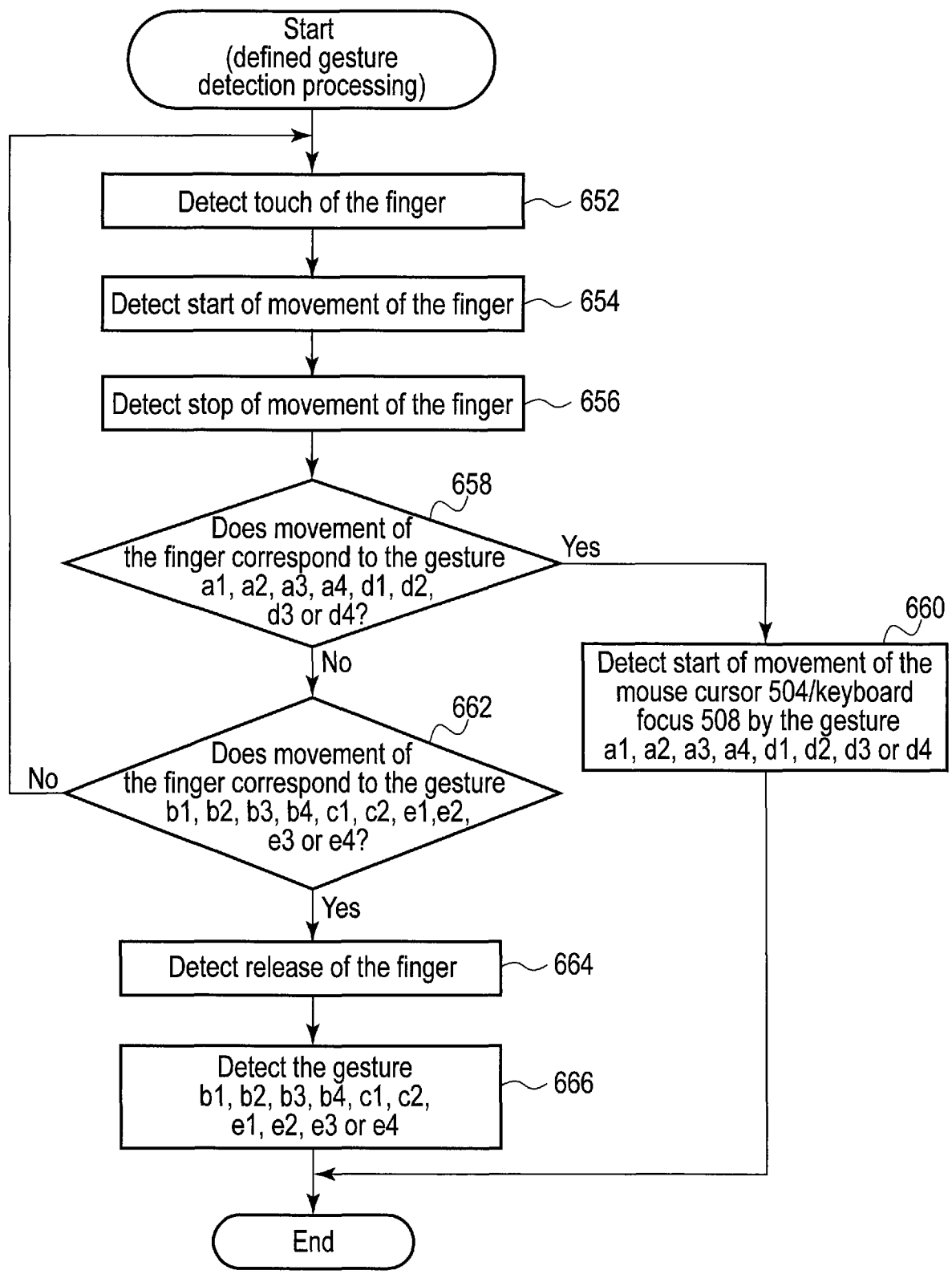
F I G. 15

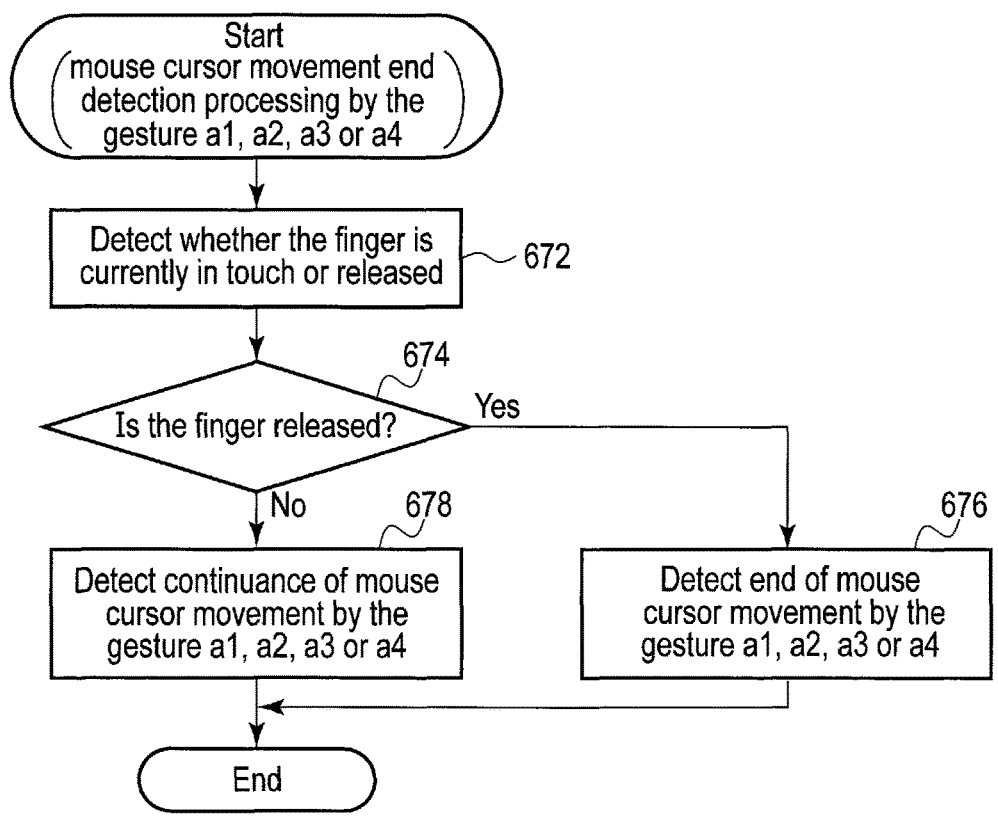
F I G. 16
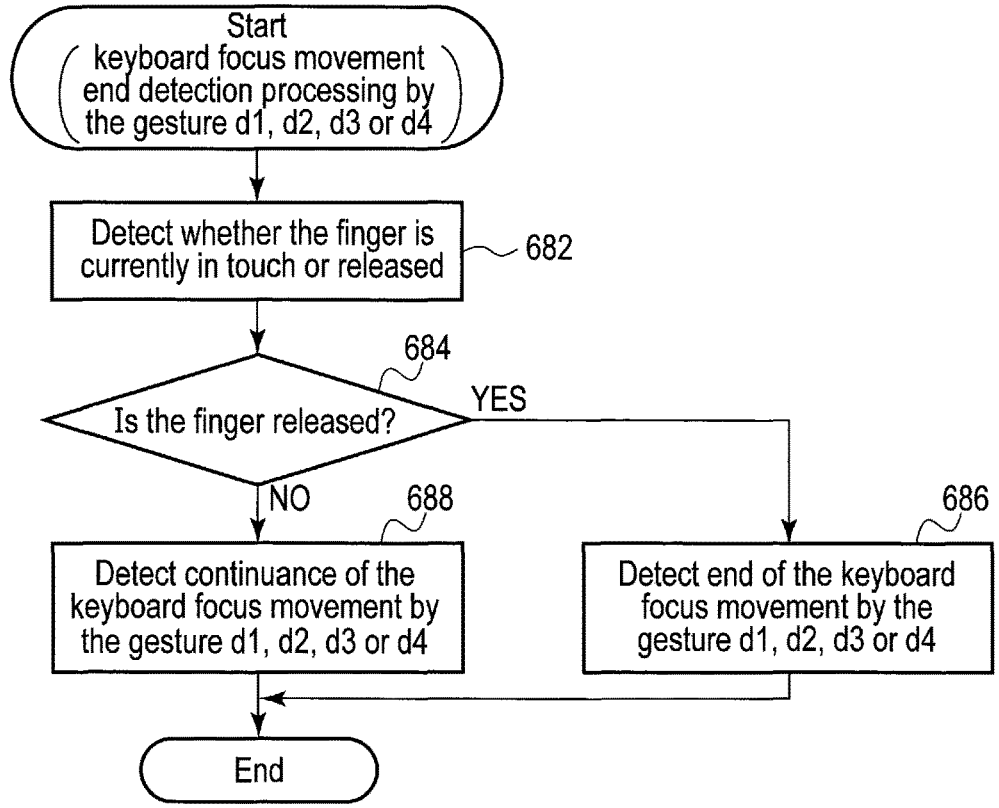
F I G. 17

WEARABLE DEVICE AND OPERATION METHOD OF EXECUTING AN ACTION ON THE SCREEN ACCORDANCE WITH FINGER TRACING ON THE SIDE EDGES OF THE TOUCH PAD

CROSS-REFERENCE TO RELATED APPLICATIONS

This application is based upon and claims the benefit of priority from Japanese Patent Application No. 2018-014029, filed Jan. 30, 2018, the entire contents of which are incorporated herein by reference.

FIELD

Embodiments described herein relate generally to a wearable device and an operation method of a wearable device.

BACKGROUND

Recently, an IoT (Internet of Things) age in which many things are connected through the Internet has come. A technique called "edge computing" is required as a tool for network communication and information sharing in offices, factories, and in other various situations. In order to realize the edge computing, development of a practical mobile edge computing device having high degrees of versatility and high processing capacity, and able to be used by a worker (also called user) on site, is needed separately from a data center (or cloud). Thereby, it is expected that promotion of the operational efficiency and productivity improvement at a workplace and the like, or load dispersion of data and improvement of a network environment will be achieved.

A mobile edge computing device is implemented as a wearable device or is implemented in connection with a wearable device. As an example of a wearable device, there is an eye glasses-type wearable terminal in which a display and a touch pad are included in eye glasses, helmet, or goggles attached to a user's head. The touch pad detects an operating direction of a finger, and inputs a command in accordance with the operating direction of the finger. In such a wearable device, the display is positioned on the user's line of sight and the touch pad is positioned on a side of the user's head.

The touch pad in the wearable device inevitably needs to be miniaturized, which makes it difficult for the user to move a finger in predetermined directions within the limited touch area. Further, the user wearing the eye glasses-type wearable device cannot see the finger operating the touch pad but has to operate the touch pad gropingly. It is very difficult for the user gropingly operating the touch pad to move the finger in predetermined directions. Accordingly, the user may not able to input appropriately a command through the touch pad.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a block diagram showing an example of a remote support system including an electronic device of an embodiment.

FIG. 2 is a block diagram showing an exemplary structure of an operator terminal 12 in FIG. 1.

FIG. 6 is a block diagram showing an exemplary structure of the wearable device main body 24.

FIG. 9A shows a perspective view of the touch pad 110.

FIG. 9B shows a plane view of the touch pad 110.

FIG. 11A illustrates an example of the correspondences between the gestures shown in FIGS. 10A and 10B and the commands input into the mobile PC 16.

FIG. 11B illustrates an example of the correspondences between the gestures shown in FIGS. 10C to 10E and the commands input into the mobile PC 16.

FIG. 15 shows an example of the defined gesture detection processing.

FIG. 16 illustrates an example of the mouse cursor movement end detection processing.

FIG. 17 illustrates an example of the keyboard focus movement end detection processing.

DETAILED DESCRIPTION

Figure 3:
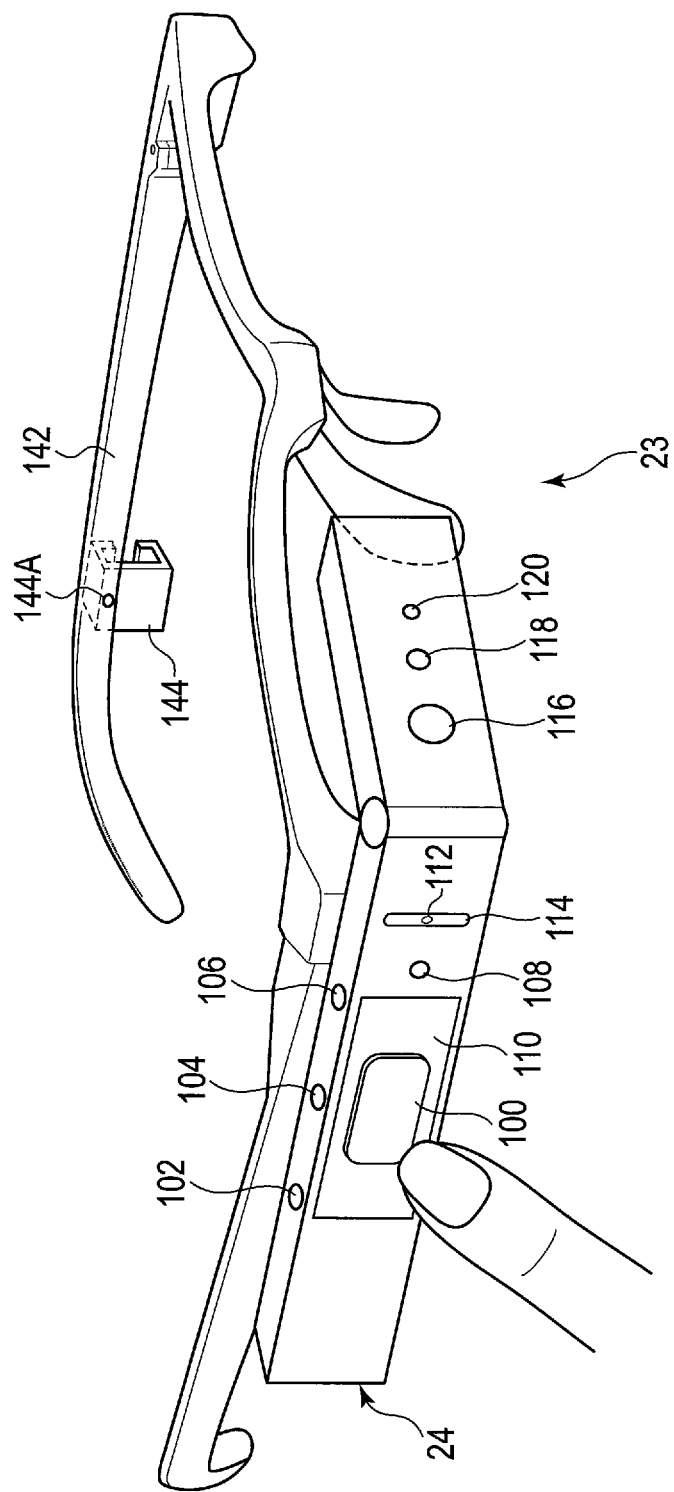
FIG. 3 is a view showing an example of an external appearance of a wearable device 23 to be connected to a mobile PC 16 in FIG. 1.

Various embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, an electronic device includes a display, a detector, and a hardware processor. The display displays a screen keyboard on a screen when an instruction is input. The detector comprises a polygonal plate and detects a tracing action of a finger over a side of the polygonal plate. The hardware processor determines whether the screen keyboard is displayed on the screen when the detector detects the tracing action, and executes an action on the screen in accordance with the tracing action detected by the detector when the hardware processor determines that the screen keyboard is displayed.

[Remote Support System]

FIG. 1 is a block diagram showing an example of a remote support system that realizes edge computing. The remote support system is used by an operator at the rear to support a user, for example, a user at a workplace from a remote place. Examples of work at the workplace include a complicated maintenance service, picking operation in a distribution warehouse, monitoring of a workplace, disaster relief/medical support, and the like. The user side of the workplace is also called a front end, and the operator side at the rear is also called a back end. In the remote support system, a mobile personal computer (PC) (also called a mobile edge computing device in some cases) 16 carried by the user and remote support center (data center) 18 located at a position distant from the user are connected to each other through a network 22, such as the Internet, so that communication can be carried out between them. The mobile PC 16 and the remote support center 18 may be connected to the network 22 through wired LAN cables or may be connected to the network 22 through a wireless LAN, Bluetooth (registered trade mark), and the like.

A wearable device 23 is connected to the mobile PC 16. Although FIG. 1 shows an example in which the wearable device 23 is connected to the mobile PC through a cable, the wearable device 23 may also be connected to the mobile PC 16 through a wireless LAN, Bluetooth or the like. The wearable device 23 is provided with a camera and a display device. An image shot by the camera may be transmitted to the mobile PC 16, and the image transmitted from the mobile PC 16 may be displayed on the display device.

As shown in FIG. 1, it is also possible for a plurality of users to communicate with each other through the network. In this case, communication may also be carried out through the remote support center 18, and communication can also be carried out only between the users without being carried out through the operator of the remote support center 18.

The remote support center 18 is provided with an operator terminal 12 and a server 14. The remote support center 18 makes a voice call or an information exchange between the mobile PC 16 (and wearable device 23) and the operator terminal 12. It is possible to carry out video distribution of a real-time image shot by the wearable device 23 (connected to the mobile PC 16) to the operator terminal 12, and it is also possible to carry out mutual transmission/reception of an image between the mobile PC 16 and the operator terminal 12. Further, it is also possible to transmit a text message from the operator terminal 12 to the mobile PC 16. For example, in the picking operation at the distribution warehouse, a place of a picking item is displayed on the wearable device 23, whereby hands-free picking can be realized.

The remote support typically includes, for example, the following functions:

A voice call function of carrying out an interactive voice call between the mobile PC 16 and the operator terminal 12;

A live image distribution function of carrying out video distribution of a real-time image shot by the wearable device 23 to the operator terminal 12 during a voice call;

A function of carrying out transmission/reception of a still image between the mobile PC 16 and the operator terminal 12 during a voice call (The mobile PC 16 transmits a shot still image or a capture image being video-distributed to the operator terminal 12. The operator terminal 12 edits the received image by writing characters or pictures, and transmits the edited image to the mobile PC 16. The still image received by the mobile PC 16 is stored in a folder in the mobile PC 16, and can be browsed.);

A screen sharing function of displaying the entire desktop screen of the operator terminal 12 or a window of an arbitrary application program on the wearable device 23 during a voice call; and A text message transmitting function of transmitting a text message from the operator terminal 12 to the mobile PC 16.

The server 14 carries out processing for remote support in place of or in cooperation with the operator terminal 12, and is provided with a hardware processor (CPU) 28, ROM 30, RAM 32, and a storage device 34 constituted of a hard disk drive (HDD) or solid-state drive (SSD), and interface 36. The operator terminal 12 may be made to have all the functions of the server 14, and the server 14 may be omitted.

[Operator Terminal 12]

FIG. 2 is a block diagram showing an exemplary structure of the operator terminal 12. The operator terminal 12 is constituted of a desktop PC, notebook PC or the like.

The operator issues an instruction to the user having the mobile PC 16 by a conversation or image while confirming the situation of the workplace on the basis of a real-time image by using the operator terminal 12. The operator can write pictures or characters to the image file received from the mobile PC 16 by using the operator terminal 12 to edit the image file, transmit the edited image file to the mobile PC 16, and store the edited image file into the operator terminal 12.

The operator terminal 12 is provided with a system controller 42 including a hardware processor. A main memory 44, a BIOS-ROM 50, a storage device 52 constituted of HDD or SSD, an audio codec 54, a graphics controller 62, a touch panel 70, a USB (registered trade mark) connector 72, a wireless LAN device 74, a Bluetooth device 76, a wired LAN device 78, a PCI Express (registered trade mark) card controller 80, a memory card controller 82, an embedded controller/keyboard controller (EC/KBC) 84, and the like are connected to the system controller 42.

The system controller 42 executes various programs to be loaded from the storage device 52 into the main memory 44. These programs include an operating system (OS) 46, and back-end application program 48 for remote support. The system controller 42 also executes the Basic Input/Output System (BIOS) stored in the BIOS-ROM 50 which is a nonvolatile memory. The BIOS is a system program for hardware control.

The audio codec 54 converts a digital audio signal which is an object to be reproduced into an analog audio signal, and supplies the converted analog audio signal to headphones 58 or a speaker 60. Further, the audio codec 54 converts an analog audio signal input thereto from a microphone 56 into a digital signal. The microphone 56 and the headphones 58 may be provided singly, and may also be provided in an integrated manner as an intercom.

The graphics controller 62 controls a liquid crystal display (LCD) 64 to be used as a display monitor of the operator terminal 12. The touch panel 70 is overlaid on the screen of the LCD 64, and is configured in such a manner as to allow a handwriting input operation to be carried out on the screen of the LCD 64 by means of a touch-pen or the like. An HDMI (registered trade mark) controller 66 is also connected to the graphics controller 62. The HDMI controller 66 is connected to an HDMI connector 68 for connection to an external display device.

The wireless LAN device 74 executes wireless LAN communication of the IEEE802.11 standard for the purpose of connection to the network 22. The Bluetooth device 76 executes wireless communication of the Bluetooth standard for the purpose of connection to an external device. The wired-LAN device 78 executes wired LAN communication of the IEEE802.3 standard for the purpose of connection to the network 22. As described above, the connection between the operator terminal 12 and the network 22 may be made by wireless communication or may be made by wired communication.

The PCI Express card controller 80 carries out communication of the PCI Express standard between the operator terminal 12 and an external device. The memory card controller 82 writes data into a storage medium, for example, a memory card such as an SD (Secure Digital) card (registered trade mark), and reads data from the memory card.

The EC/KBC 84 is a power management controller, and is realized as a one-chip microcomputer incorporating therein also a keyboard controller that controls a keyboard 88. The EC/KBC 84 has a function of powering on or powering off the operator terminal 12 according to an operation of a power switch 86. Control of the power-on and power-off is executed by cooperation between the EC/KBC 84 and a power circuit 90. Even while the operator terminal 12 is in the power-off state, the EC/KBC 84 operates by power from a battery 92 or an AC adaptor 94. The power circuit 90 uses the power from the battery 92 or from the AC adaptor 94 (to be connected as an external electric power supply) to generate the power to be supplied to each component.

[Wearable Device 23]

FIG. 3 shows an example of an external appearance of the wearable device 23 to be connected to the mobile PC 16. The wearable device 23 is provided with an eyeglass frame 142 and a wearable device main body 24. The eyeglass frame 142 may have a shape obtained by removing lenses from general eyeglasses and is worn on the face of the user. The eyeglass frame 142 may have a structure to which eyeglasses can be attached. When the user habitually uses eyeglasses at all times, lenses of degrees identical to the habitually used eyeglasses may be attached to the eyeglass frame 142.

The eyeglass frame 142 is provided with mounting brackets 144 on both the right temple and the left temple thereof. The wearable device main body 24 is attached to and detached from one of the mounting brackets 144 on the right or left temple. In FIG. 3, the mounting bracket 144 on the temple at the right side of the user is hidden behind the wearable device main body 24, and hence is not shown. As described above, the wearable device main body 24 is provided with a display device 124 (shown in FIG. 4). The display device 124 is configured in such a way as to be viewed by one eye. Therefore, the mounting brackets 144 are provided on both the right temple and the left temple so that the wearable device main body 24 can be attached to the mounting bracket on the dominant eye side. The wearable device main body 24 need not be detachably attached to the eyeglass frame 142 by means of the mounting bracket 144. The wearable devices 23 for the right and left eyes in which the wearable device main bodies 24 are respectively fixed to the eyeglass frames 142 on the right left frames may be prepared. Furthermore, the wearable device main body 24 may not be attached to the eyeglass frame 142, but may be attached to the head of the user by using a helmet or a goggle.

An engaging piece 128 (shown in FIG. 4) of the wearable device main body 24 is forced between a upper frame and a lower frame of the mounting bracket 144, whereby the wearable device main body 24 is attached to the eyeglass frame 142. When the wearable device main body 24 is to be detached from the eyeglass frame 142, the wearable device main body 24 is plucked out of the mounting bracket 144.

In a state where the wearable device main body 24 is attached to the mounting bracket 144, the engaging piece 128 is somewhat movable backwardly and forwardly in the mounting bracket 144. Accordingly, the wearable device main body 24 is adjustable in the front-back direction so that the user's eye can be brought to a focus on the display device 124. Furthermore, the mounting bracket 144 is rotatable around an axis 144A perpendicular to the temple. After the wearable device main body 24 is attached to the eyeglass frame 142, the wearable device main body 24 is adjustable in the vertical direction so that the display device 124 can be positioned on the user's line of sight. Moreover, the rotational angle of the mounting bracket 144 is about 90 degrees and, by largely rotating the mounting bracket 144 in the upward direction, the wearable device main body 24 can be flipped up from the eyeglass frame 142. Thereby, even when it is difficult to watch the real thing because the field of view is obstructed by the wearable device main body 24 or even when the wearable device main body 24 interferes with surrounding objects in a small space, it is possible to temporarily divert/restore the wearable device main body 24 from/to the field of view of the user without detaching/reattaching the entire wearable device 23 from/to the face of the user.

[Wearable Device Main Body 24]

The wearable device main body 24 is constituted of a side part to be along the temple of the eyeglass frame 142, and a front part to be positioned on the line of sight of one eyeball of the user. The angle which the front part forms with the side part is adjustable.

As shown in FIG. 3, on the outside surface of the front part, a camera 116, a light 118, and a camera LED 120 are provided. The light 118 is an auxiliary lighting fixture emitting light at the time of shooting a dark object. The camera LED 120 is turned on at the time of shooting a photograph or a video to thereby cause the objective person to be photographed to recognize that he or she is to be photographed.

On the top surface of the side part of the wearable device main body 24 attached to the right side temple, a first button 102, a second button 104, and a third button 106 are provided. When the dominant eye of the user is the left eye, the wearable device main body 24 is attached to the left side temple. The top and the bottom of the wearable device main body 24 are reversed according to whether the wearable main body 24 is attached to the right side temple or the left side temple. Therefore, the first button 102, the second button 104, and the third button 106 may be provided on both the top surface and the undersurface of the side part.

On the outside surface of the side part, a touch pad 110, a fourth button 108, a microphone 112, and an illuminance sensor 114 are provided. The touch pad 110 and the fourth button 108 can be operated by a forefinger. When the wearable device main body 24 is attached to the right side temple, the buttons 102, 104, and 106 are arranged at positions at which the buttons 102, 104, and 106 can be operated by a forefinger, a middle finger, and a third finger, respectively. A touch surface of the touch pad 110 is provided with a polygonal plate 100 with a thickness of several millimeters. Examples of a polygon may include a square, a rectangle, a square with round corners, and a rectangle with round corners. The details of the touch pad 110 will be described with reference to FIGS. 9A and 9B. The touch pad 110 is configured such that the finger is moved upwardly, downwardly, rightward, and leftward along four sides of the plate 100. Upon detection of upward, downward, rightward, or leftward movement of the finger, the touch pad 110 inputs a command. In this description, the command implies an executive instruction to execute specific processing to be issued to the wearable device main body 24. Operation procedures for the first to fourth buttons 102, 104, 106, and 108, and the touch pad 110 are determined in advance by the application program.

For example, when the third button 106 is pressed once, item selection/item execution is carried out, when the third button 106 is pressed for a long time, a list of activated application programs is displayed, when the second button 104 is pressed once, the screen returns to the home screen, when the second button 104 is pressed for a long time, a menu of quick settings is displayed, and when the first button 102 is pressed once, cancellation (operation identical to the operation of the Esc key of the keyboard) of an operation is executed.

The first button 102 is arranged at such a position as to be operated by a forefinger, the second button 104 at a position by a middle finger, the third button 106 at a position by a third finger, and the fourth button 108 at a position by a little finger. The reason why the fourth button 108 is provided not on the top surface of the side part, but on the outside surface of the side part in FIG. 3 is that there is space restriction. The fourth button 108 may also be provided on the top surface of the side part in the same manner as the first to third buttons 102, 104, and 106. The illuminance sensor 114 detects the illuminance of the surrounding area in order to automatically adjust the brightness of the display device.

Figure 4:
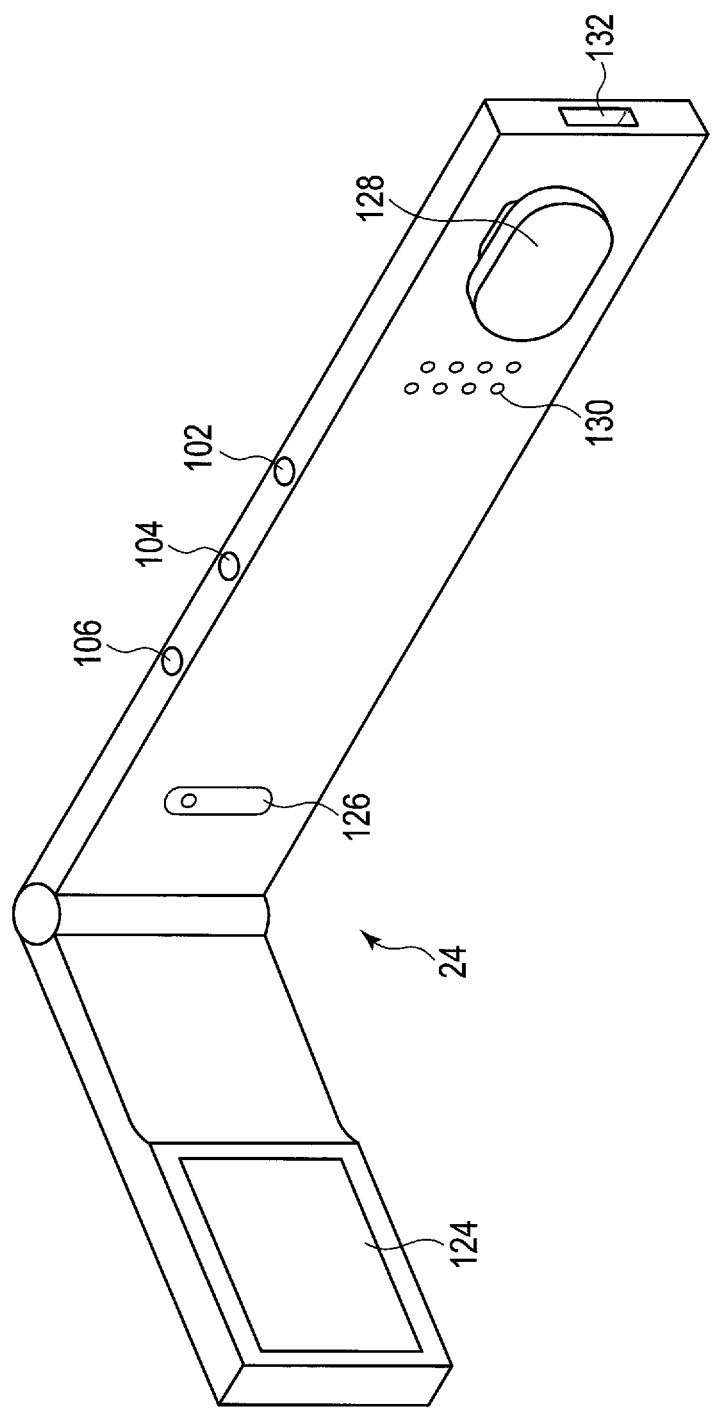
FIG. 4 is a view showing an example of an external appearance of a main body 24 of the wearable device 23.

FIG. 4 shows an example of an external appearance of the back side of the wearable device main body 24. On the inner side of the front part, a display device 124 constituted of an LCD is provided. On the inner side of the side part, a microphone 126, a speaker 130, and an engaging piece 128 are provided. The microphone 126 is provided at a front position of the side part, and the speaker 130 and the engaging piece 128 are provided at a rear position of the side part. Headphones may be used in place of the speaker 130. In this case, the microphone and the headphones may also be provided in an integrated manner as an intercom in the same manner as the operator terminal 12.

Figure 5:
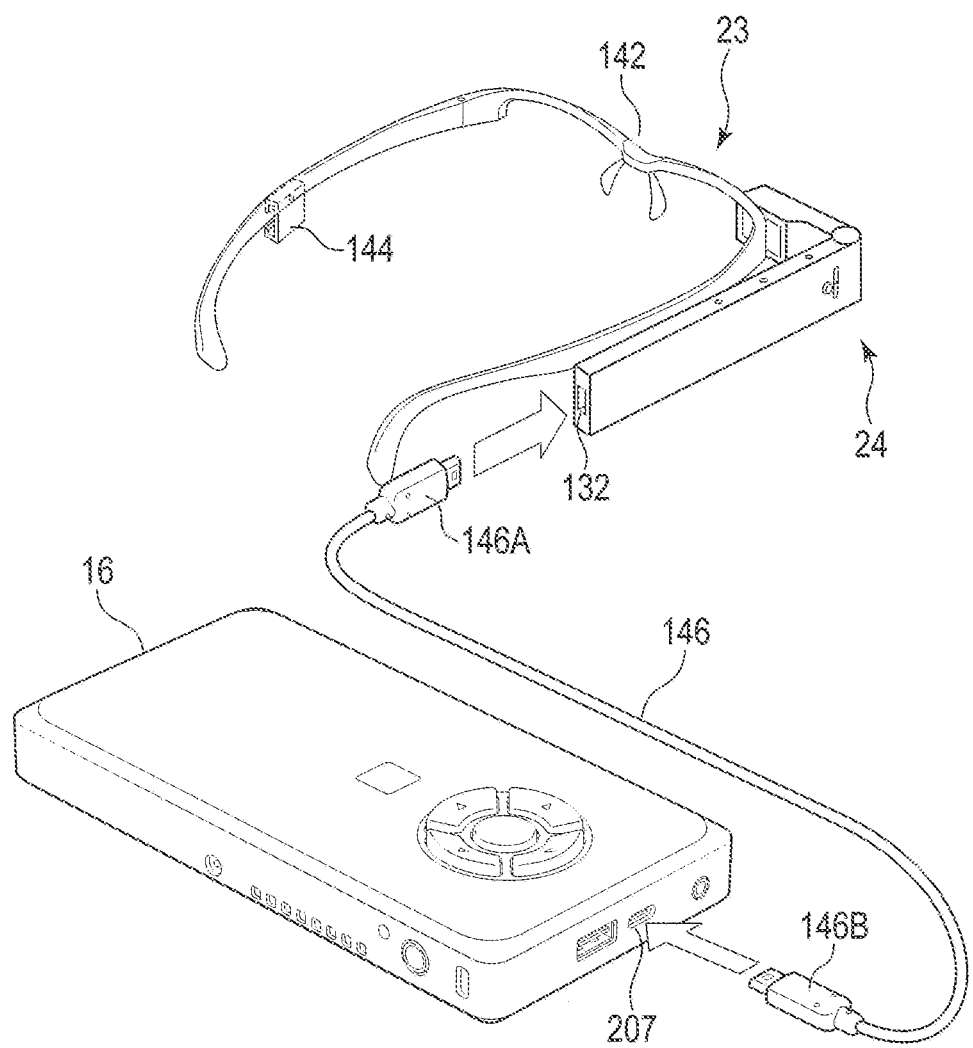
FIG. 5 is a view showing an example of connection between the mobile PC 16 and the wearable device main body 24.

FIG. 5 shows an example of connection between the mobile PC 16 and the wearable device main body 24. At a rear position of the side part, a receptacle 132 into which a plug 146A at one end of a cable 146 conforming to the USB type-C (registered trade mark) standard is to be inserted is provided. The receptacle 132 and the plug 146A may be generally called a connector. A plug 146B at the other end of the USB type-C cable 146 is inserted into a receptacle 207 conforming to the USB type-C standard provided on an upper end face of the mobile PC 16. The receptacle 207 and the plug 146B may be generally called a connector. As described above, the wearable device main body 24 is connected to the mobile PC 16 through the USB type-C cable 146, and image signals and the like are transmitted from/to the wearable device main body 24 to/from the mobile PC 16 through the USB type-C cable 146. The wearable device main body 24 may also be connected to the mobile PC 16 by means of wireless communication such as a wireless LAN, Bluetooth, and the like.

In the embodiment, the wearable device main body 24 is not provided with a battery or a DC terminal serving as a drive power supply, and the drive power is supplied from the mobile PC 16 to the wearable device main body 24 through the USB type-C cable 146. However, the wearable device main body 24 may also be provided with a drive power supply.

FIG. 6 is a block diagram showing an exemplary structure of the wearable device main body 24. The USB type-C connector (receptacle) 132 is connected to a mixer 166. A display controller 170 and a USB hub 164 are respectively connected to a first terminal and a second terminal of the mixer 166. The display device 124 is connected to the display controller 170. A camera controller 168, an audio codec 172, and a sensor controller 162 are connected to the USB hub 164. The camera 116, the light 118, and the camera LED 120 are connected to the camera controller 168. Audio signals from the microphones 112 and 126 are input to the audio codec 172, and an audio signal from the audio codec 172 is input to the speaker 130 through an amplifier 174.

A motion sensor (for example, an acceleration sensor, a geomagnetism sensor, a gravitation sensor, a gyroscopic sensor, etc.) 176, the illuminance sensor 114, a proximity sensor 178, the touch pad 110, the first to fourth buttons 102, 104, 106 and 108, and a GPS sensor 180 are connected to the sensor controller 162. The sensor controller 162 processes detection signals from the motion sensor 176, the illuminance sensor 114, the proximity sensor 178, the touch pad 110, the first to fourth buttons 102, 104, 106 and 108, and the GPS sensor 180, and supplies a command to the mobile PC 16. Although not shown in FIG. 4, the motion sensor 176 and the proximity sensor 178 are arranged inside the wearable device main body 24. The motion sensor 176 detects a motion, a direction, a posture and the like of the wearable device main body 24. The proximity sensor 178 detects attachment of the wearable device 23 on the basis of approach of a face, a finger and the like of the user thereto.

[Mobile PC 16]

Figure 7:
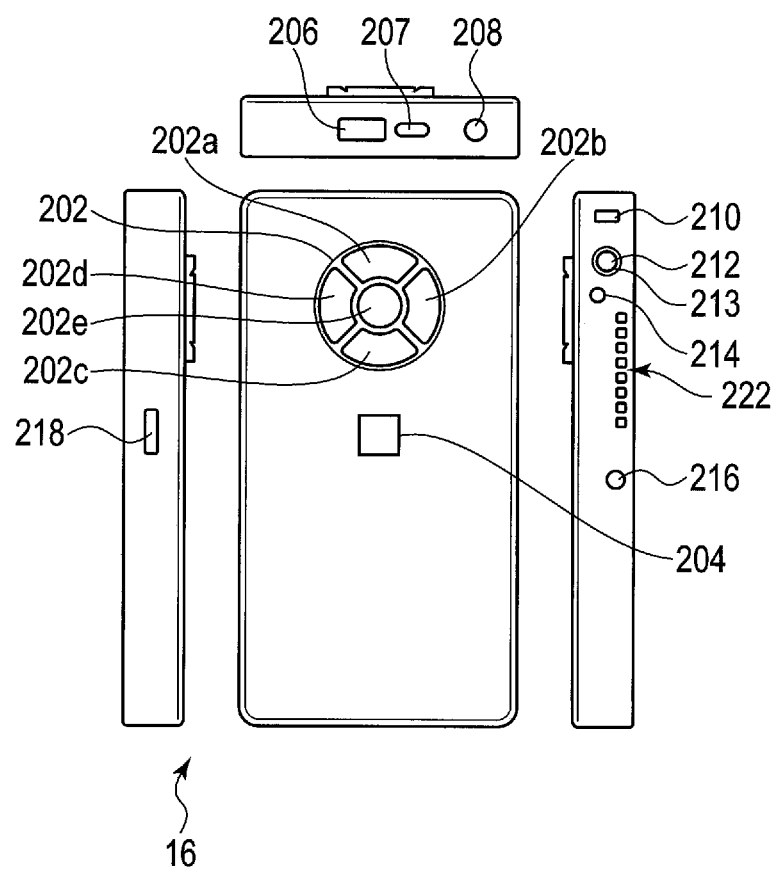
FIG. 7 is a view showing an example of an external appearance of the mobile PC 16.

FIG. 7 shows an example of an external appearance of the mobile PC (mobile edge computing device) 16. The mobile PC 16 is a small-sized PC that can be held by one hand, and has a small size and a light weight, i.e., a width thereof is about 10 cm or less, a height thereof is about 18 cm or less, a thickness thereof is about 2 cm, and a weight thereof is about 300 g. Accordingly, the mobile PC 16 can be held in a pocket of the work clothing, a holster to be attached to a belt, or a shoulder case, and is wearable. Although the mobile PC 16 incorporates therein semiconductor chips such as a CPU, a semiconductor memory and the like, and storage devices such as a Solid State Drive (SSD) and the like, the mobile PC 16 is not provided with a display device and a hardware keyboard for input of characters.

On the front surface of the mobile PC 16, five buttons 202 constituted of an up button 202a, a right button 202b, a down button 202c, a left button 202d, and a decision button 202e (also called a center button or an enter button) are arranged, and a fingerprint sensor 204 is arranged below the five buttons 202. The mobile PC 16 is not provided with a hardware keyboard for input of characters, and a password (also called a PIN) cannot be input. Therefore, the fingerprint sensor 204 is used for user authentication at the time of login of the mobile PC 16. The five buttons 202 can input a command.

User authentication at the time of login may be carried out by allocating numeric characters to the buttons 202*a* to 202*d* of the five buttons 202, and by inputting a password using the five buttons 202. In this case, the fingerprint sensor 204 can be omitted. Numeric characters are allocated to the four buttons 202*a* to 202*d* other than the decision button 202*e*, and the number of the numeric characters is only four. Thus, there is a possibility of numeric characters input in a random manner being coincident with the password. However, by making the digit number of the password large, it is possible to make the probability that the numeric characters input in a random manner will be coincident with the password low. Authentication by the five buttons 202 may be enabled in also the mobile PC 16 provided with the fingerprint sensor 204. Although one mobile PC 16 may be shared among a plurality of users, it is not possible to cope with such a case by only the fingerprint authentication.

The operations identical to those of the buttons 102, 104, 106 and 108, and the touch pad 110 of the wearable device main body 24 can also be applied to the five buttons 202. The user cannot watch the state where the buttons 102, 104, 106 and 108, and the touch pad 110 of the wearable device main body 24 are being operated. Therefore, it may be necessary for a user to become accustomed to carrying out an intended operation depending on the user. Further, the buttons 102, 104, 106 and 108 and the touch pad 110 are small in size, and thus they may be difficult to operate. In the embodiment, the five buttons 202 of the mobile PC 16 can also be operated in the same manner as the buttons 102, 104, 106 and 108 and the touch pad 110, and hence the above-mentioned difficulty can be dispelled. The operation procedures of the five buttons 202 are determined in advance by the application program.

For example, when the decision button 202*e* is pressed once, item selection/item execution is carried out (corresponding to a pressing of the third button 106 in the wearable device main body 24), when the decision button 202*e* is pressed for a long time, ending or cancellation of an operation is carried out (corresponding to a pressing of the first button 102 in the wearable device main body 24), when the up button 202*a* is pressed once, the cursor is moved upward (corresponding to an upward drag on the touch pad 110 in the wearable device main body 24), when the up button 202*a* is pressed for a long time, a list of activated application programs is displayed (corresponding to a pressing of the third button 106 for a long time in the wearable device main body 24), when the down button 202*c* is pressed once, the cursor is moved downward (corresponding to a downward drag on the touch pad 110 in the wearable device main body 24), when the down button 202*c* is pressed for a long time, a menu of quick settings is displayed (corresponding to a pressing of the second button 104 for a long time in the wearable device main body 24), when the left button 202*d* is pressed once, the right icon is selected (corresponding to a backward drag/flick on the touch pad 110 in the wearable device main body 24), and when the right button 202*b* is pressed once, the left icon is selected (corresponding to a forward drag/flick on the touch pad 110 in the wearable device main body 24).

On the upper side face of the mobile PC 16, a USB 3.0 connector (receptacle) 206, the USB type-C connector (receptacle) 207, and an audio jack 208 are provided.

On one side face (a side face on the left side when viewed from the front) of the mobile PC 16, a memory card slot 218 for a memory card is provided. The memory card includes, for example, an SD card (registered trade mark), a micro SD card (registered trade mark) card, and the like.

On the other side face (a side face on the right side when viewed from the front) of the mobile PC 16, a slot 210 for Kensington Lock (registered trade mark), a power switch 212, a power LED 213, a DC IN/battery LED 214, a DC terminal 216, and ventilation holes 222 for cooling are provided. The power LED 213 is arranged around the power switch 212, and turned on during the period of power-on of the mobile PC 16. The DC IN/battery LED 214 indicates the state of the mobile PC 16 such as whether or not the battery is being charged, and the remaining battery level. Although the mobile PC 16 can be driven by the battery, the mobile PC 16 can also be driven in the state where the AC adaptor is connected to the DC terminal 216. Although not shown in FIG. 7, the back side of the mobile PC 16 is configured such that the battery can be replaced with a new one by a one-touch operation.

Figure 8:
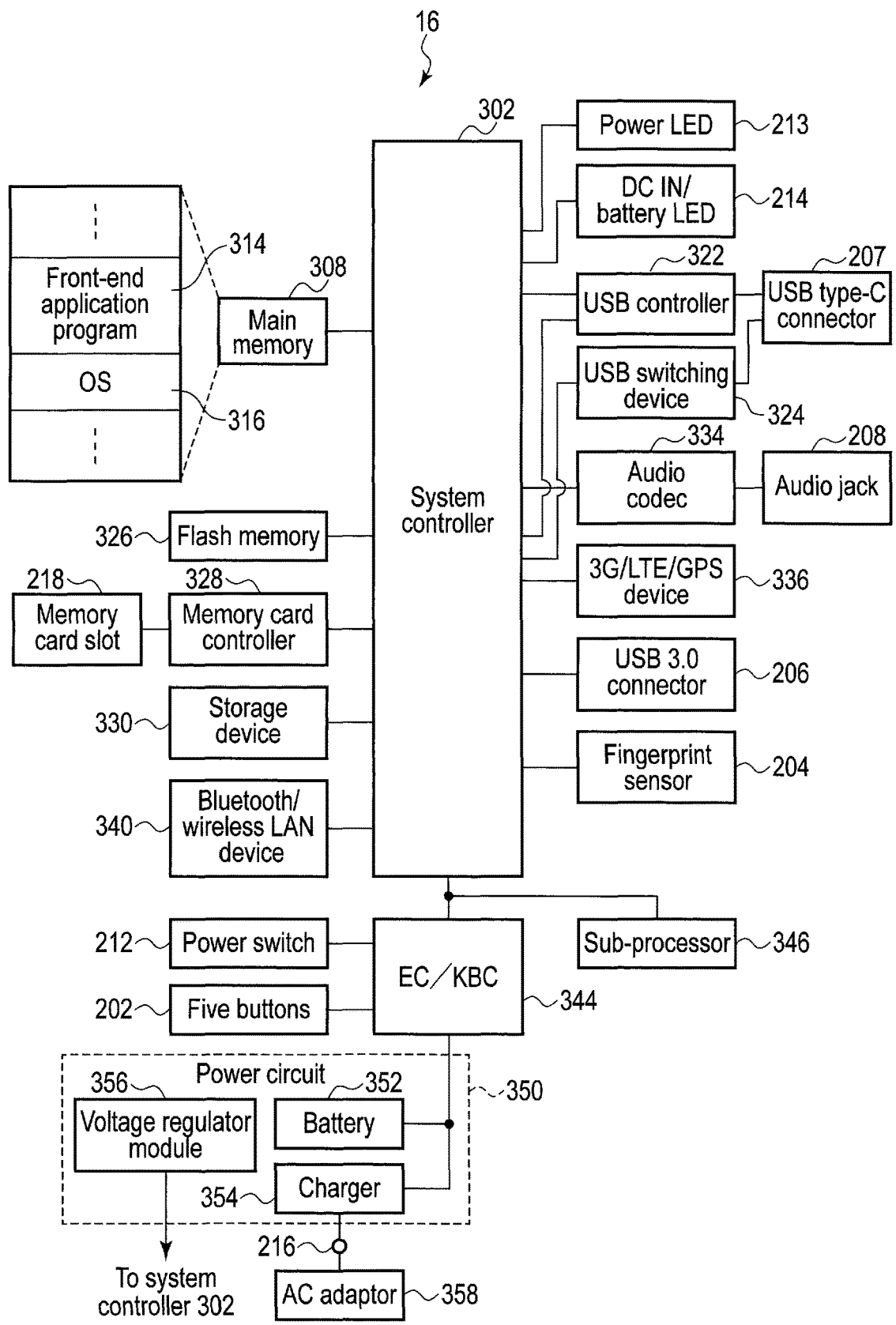
FIG. 8 is a block diagram showing an exemplary structure of the mobile PC 16.

FIG. 8 is a block diagram showing an exemplary structure of the mobile PC 16. The mobile PC 16 can carry out video distribution of an image shot by the wearable device main body 24 to the operator terminal 12, and enables browse of the image received from the operator terminal 12. For this reason, the mobile PC 16 is provided with a camera function and a viewer function. The camera function is a function of shooting a photograph or a video by means of the camera 116 of the wearable device main body 24. The shot photograph and video are stored in a camera folder (not shown in FIG. 8) in the mobile PC 16, and can be browsed by the viewer function. The viewer function is a function of enabling browse of a file stored in the camera folder. The types of the files include still images, moving images, PDF files, photographs and videos shot by the camera function, images received from the operator terminal 12, images transmitted to the operator terminal 12, and files stored in a user folder (not shown in FIG. 8) in the mobile PC 16.

The mobile PC 16 is provided with a system controller 302. The system controller 302 is constituted of a hardware processor (CPU) and a controller/hub (not shown in FIG. 8). A main memory 308, the power LED 213, the DC IN/battery LED 214, and a USB controller 322 are connected to the processor of the system controller 302. A flash memory 326, a memory card controller 328, a storage device 330 constituted of an HDD or an SSD, a USB switching device 324, an audio codec 334, a 3G/LTE/GPS device 336, the fingerprint sensor 204, the USB 3.0 connector 206, a Bluetooth/wireless LAN device 340, and an EC/KBC 344 are connected to the controller/hub of the system controller 302.

The system controller 302 executes various programs to be loaded from the storage device 330 into the main memory 308. These programs include an OS 316, and a front-end application program 314 for remote support.

The audio codec 334 converts a digital audio signal which is an object (to be reproduced) into an analog audio signal, and supplies the converted analog audio signal to the audio jack 208. Further, the audio codec 334 converts an analog audio signal input from the audio jack 208 into a digital signal.

The memory card controller 328 accesses to a memory card such as an SD card to be inserted into the memory card slot 218, and controls read/write of data from/to the SD card.

The USB controller 322 carries out control of transmission/reception of data to/from the USB type-C cable 146 (shown in FIG. 5) connected to the USB type-C connector 207 or a USB 3.0 cable (not shown) connected to the USB 3.0 connector 206.

Although not shown, a port extension adaptor including ports or connectors according to several interfaces can be connected also to the USB type-C connector 207, and an interface which is not provided in the mobile PC 16, such as an HDMI or the like, can be used.

The Bluetooth/wireless LAN device 340 executes wireless communication conforming to the Bluetooth/IEEE802.11 standard for the purpose of connection to the network 22. The connection to the network 22 may not depend on wireless communication, and may depend on wired LAN communication conforming to the IEEE802.3 standard.

The fingerprint sensor 204 is used for fingerprint authentication at the time of startup of the mobile PC 16.

A sub-processor 346, the power switch 212, and the five buttons 202 are connected to the EC/KBC 344. The EC/KBC 344 has a function of turning on or turning off the power to the mobile PC 16 according to the operation of the power switch 212. The control of power-on and power-off is executed by cooperative operation of the EC/KBC 344 and the power circuit 350. Even during a power-off period of the mobile PC 16, the EC/KBC 344 operates by the power from a battery 352 or an AC adaptor 358 (connected as an external power supply). The power circuit 350 uses the power from the battery 352 or the AC adaptor 358 to thereby generate power to be supplied to each component of the mobile PC 16. The power circuit 350 includes a voltage regulator module 356. The voltage regulator module 356 is connected to the processor in the system controller 302.

Although the mobile PC 16 is constituted as a body separate from the wearable device main body 24, the mobile PC 16 may be incorporated into the wearable device main body 24, and both of them may also be integrated into one body.

[Touch Pad 110]

The wearable device 23 includes no hardware keyboard, and the user uses the touch pad 110 to enter characters or commands, move the cursor, select an icon, or the like. For example, when various operation menus, instructions to the user, and others are displayed as icons on the display device 124, the user operates the touch pad 110 to move the cursor and select an icon. In addition, while a screen keyboard is displayed on the display device 124, the user operates the touch pad 110 to enter characters or the commands.

FIGS. 9A and 9B respectively show a perspective view and a plane view of the touch pad 110. The plate 100 is formed on the center of the touch pad 110 arranged on the side surface of the wearable device main body 24, with a step of about several mm protruded from the surface. The plate 100 is square or rectangular in shape and has a plurality of, for example, four sides s1, s2, s3, s4 and four corners c1, c2, c3, c4. The square or rectangular shape herein includes not only the ones with sharp corners but also the ones with round corners as shown in FIGS. 9A and 9B. The shape of the plate 100 is not limited to square or rectangular but may be triangle, pentagon, or any other polygon.

Detectors are arranged along the four sides s1, s2, s3, and s4 of the plate 100 to detect the movement of a finger over the sides of the plate 100. The detectors may be arranged over the whole circumference of the plate 100. In the embodiment, however, only the movement directions of the finger need to be detected, and thus a plurality of, for example, eight detectors d1 to d8 are discretely arranged as shown in FIG. 93. The detectors d1 and d2 are provided at both almost ends of the side s1 of the plate 100. The detectors d3 and d4 are provided at both almost ends of the side s2 of the plate 100. The detectors d5 and d6 are provided at both almost ends of the side s3 of the plate 100. The detectors d7 and d8 are provided at both almost ends of the side s4 of the plate 100.

The detectors d1 to d8 include a pressure-sensitive, an electrostatic-capacitance, an optical, or a mechanical detection element to detect the passage of the finger through the detectors d1 to d8. The pressure-sensitive detector determines that the finger is located on the detectors d1 to d8 by the pressure of the finger. The electrostatic-capacitance detector determines that the finger is located on the detectors d1 to d8 by weak current of the finger. The optical detector determines that the finger is located on the detectors d1 to d8 by a detection light cut off or reflected by the finger. The mechanical detector determines that the finger is located on the detectors d1 to d8 by a thin switch activated by touching.

The sensor controller 162 (shown in FIG. 6) detects the order in which the finger passes through the two detectors d1 and d2; d3 and d4; d5 and d6; or d7 and d8 arranged on each of the sides s1, s2, s3, and s4 to detect the movement direction of the finger along the side, that is, the leftward, rightward, upward, or downward direction. The sensor controller 162 detects no detailed positional coordinates of the finger.

The sensor controller 162 detects not only the movement of the finger along one side of the plate 100 but also the continuous movement of the finger along a plurality of sides of the plate 100 as one action by integrating the detection results of the detectors d1 to d8. The sensor controller 162 detects the continuous movement of the finger for a period of time from an instant when the finger touches the touch pad 110 (or the plate 100) to an instant when the finger releases the touch pad 110 (or the plate 100) as one unit of input. That is, the sensor controller 162 detects a one-stroke action produced without releasing the plate 100 as one unit of input. The instant when the finger touches the plate 100 refers to the instant when any of the detectors d1 to d8 detects the touch of the finger. The instant when the finger releases the plate 100 refers to the instant when a predetermined period of time has elapsed since none of the detectors d1 to d8 has detected the finger any longer. That is, the sensor controller 162 does not determine that the finger has released the plate 100 immediately after none of the detectors d1 to d8 has detected the finger any longer, but determines that the finger has released the plate 100 upon lapse of the predetermined period of time since then.

The user wearing the eye glasses-type wearable device cannot see his/her finger operating the touch pad 110 but has to operate the touch pad 110 gropingly. Accordingly, the user may find difficulty in moving the finger in predetermined directions. That is, when the wearable device is configured such that predetermined commands are input by upward, downward, rightward, or leftward movement of the finger or a combination of upward, downward, rightward, and leftward movements of the finger, the user may not be able to input the commands appropriately if the movement of the finger in predetermined directions is impossible. In the embodiment, however, the plate 100 is formed on the surface of the touch pad 110 to allow the movement of the finger along the sides of the plate 100. Accordingly, the user can move the finger in predetermined directions. This makes it possible to input predetermined commands appropriately.

The sensor controller 162 detects gestures of tracing actions as shown in FIGS. 10A to 10E. The upper, lower, right, and left sides of the touch pad 110 are reversed between the case where the wearable device main body 24 is attached to the right temple as seen from the user and the case where the wearable device main body 24 is attached to the left temple as seen from the user. The upper, lower, right, and left sides in FIGS. 10A to 10E indicate the upper, lower, right, and left sides of the touch pad 110 in the wearable device main body 24 attached to the right temple as seen from the user as shown in FIG. 3.

Figure 10A:
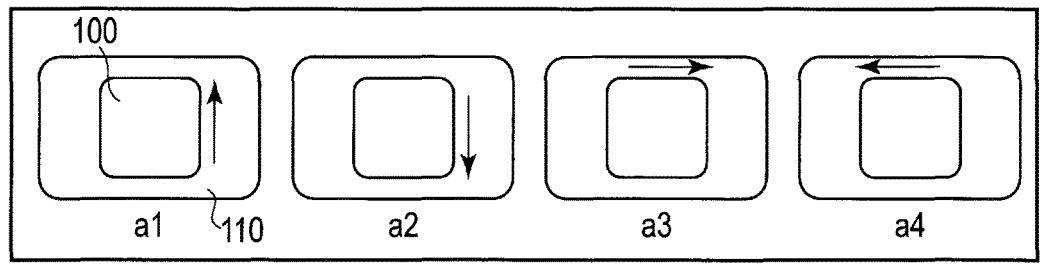
FIG. 10A illustrates gestures a1, a2, a3, and a4 of one-way tracing actions.

FIG. 10A illustrates gestures a1, a2, a3, and a4 of one-way tracing actions over one side of the plate 100. When the detectors d1 and d2 detect the touch of the finger in this order, the sensor controller 162 detects the gesture a1 of upward tracing action over the side s1. When the detectors d2 and d1 detect the touch of the finger in this order, the sensor controller 162 detects the gesture a2 of downward tracing action over the side s1. When the detectors d4 and d3 detect the touch of the finger in this order, the sensor controller 162 detects the gesture a3 of rightward tracing action (from the back to front sides of the head) over the side s2. When the detectors d3 and d4 detect the touch of the finger in this order, the sensor controller 162 detects the gesture a4 of leftward tracing action (from the front to back sides of the head) over the side s2.

Figure 10B:
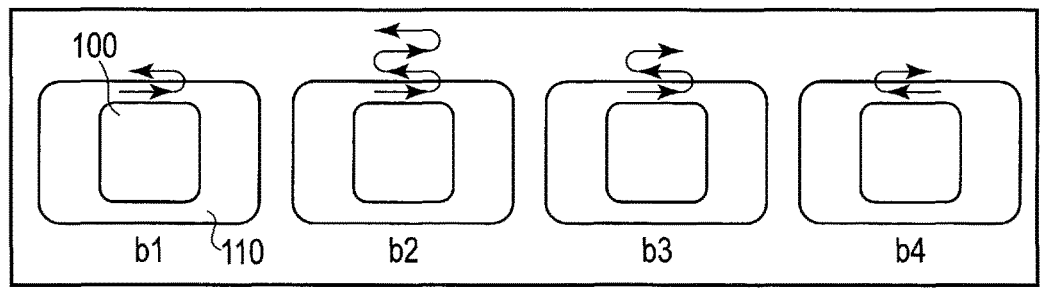
FIG. 10B illustrates gestures b1, b2, b3, and b4 of reciprocation tracing actions.

FIG. 10B illustrates gestures b1, b2, b3, and b4 of reciprocation tracing actions over the side s2. When the detectors d4, d3, and d4 detect the touch of the finger in this order, the sensor controller 162 detects the gesture b1 of reciprocation tracing action (first rightward, then leftward tracing) over the side s2. When the detectors d4, d3, d4, d3, and d4 detect the touch of the finger in this order, the sensor controller 162 detects the gesture b2 of reciprocation tracing action (first rightward, then leftward, rightward, and finally leftward tracing) over the side s2. When the detectors d4, d3, d4, and d3 detect the touch of the finger in this order, the sensor controller 162 detects the gesture b3 of reciprocation tracing action (first rightward, then leftward, and finally rightward tracing) over the side s2. When the detectors d3, d4, and d3 detect the touch of the finger in this order, the sensor controller 162 detects the gesture b4 of reciprocation tracing action (first leftward, then rightward tracing) over the side s2.

Figure 10C:
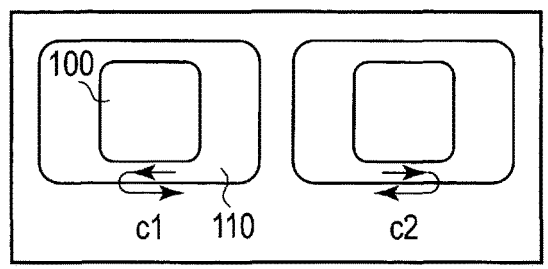
FIG. 10C illustrates gestures c1 and c2 of reciprocation tracing actions.

FIG. 10C illustrates gestures c1 and c2 of reciprocation tracing actions over a side s4 different from the side s2 shown in FIG. 10B. When the detectors d8, d7, and d8 detect the touch of the finger in this order, the sensor controller 162 detects the gesture c1 of reciprocation tracing action (first leftward, then rightward tracing) over the side s4. When the detectors d7, d8, and d7 detect the touch of the finger in this order, the sensor controller 162 detects the gesture c2 of reciprocation tracing action (first rightward, then leftward tracing) over the side s4.

Figure 10D:
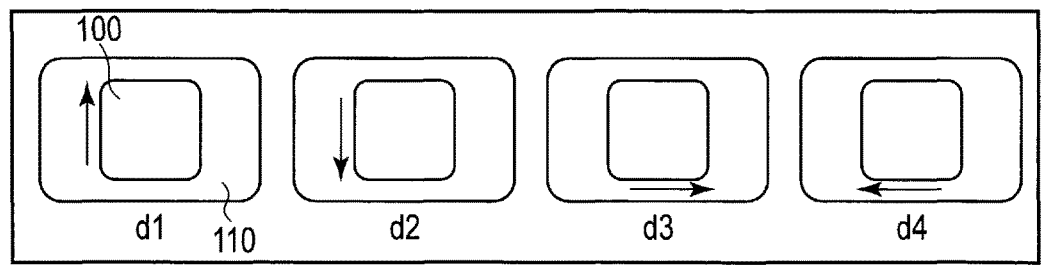
FIG. 10D illustrates gestures d1, d2, d3, and d4 of one-way tracing actions.

FIG. 10D illustrates gestures d1, d2, d3, and d4 of one-way tracing actions over a side different from the side shown in FIG. 10A. When the detectors d6 and d5 detect the touch of the finger in this order, the sensor controller 162 detects the gesture d1 of upward tracing action over the side s3. When the detectors d5 and d6 detect the touch of the finger in this order, the sensor controller 162 detects the gesture d2 of downward tracing action over the side s3. When the detectors d7 and d8 detect the touch of the finger in this order, the sensor controller 162 detects the gesture d3 of rightward tracing action over the side s4. When the detectors d8 and d7 detect the touch of the finger in this order, the sensor controller 162 detects the gesture d4 of leftward tracing action over the side s4.

Figure 10E:
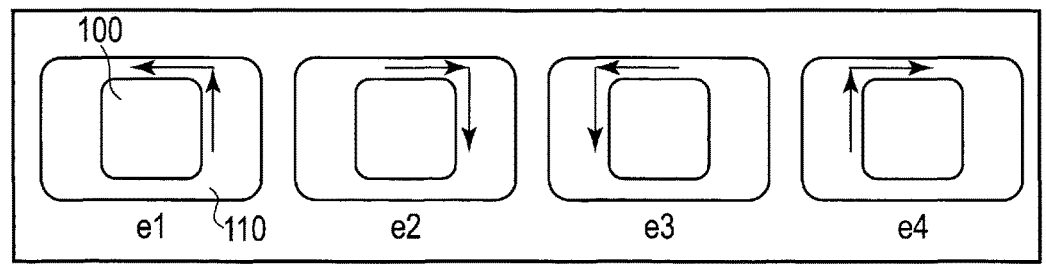
FIG. 10E illustrates gestures e1, e2, e3, and e4 of consecutive tracing actions.

FIG. 10E illustrates gestures e1, e2, e3, and e4 of consecutive tracing actions over two adjacent sides. When the detectors d1, d2, d3, and d4 detect the touch of the finger in this order, the sensor controller 162 detects the gesture e1 of upward and leftward tracing action over the sides s1 and s2. When the detectors d4, d3, d2, and d1 detect the touch of the finger in this order, the sensor controller 162 detects the gesture e2 of rightward and downward tracing action over the sides s2 and s1. When the detectors d3, d4, d5, and d6 detect the touch of the finger in this order, the sensor controller 162 detects the gesture e3 of leftward and downward tracing action over the sides s2 and s3. When the detectors d6, d5, d4, and d3 detect the touch of the finger in this order, the sensor controller 162 detects the gesture e4 of upward and rightward tracing action over the sides s3 and s2.

The gestures a1 to a4 shown in FIG. 10A and the gestures d1 to d4 shown in FIG. 10D are identical in the tracing direction of the finger but different in the traced side of the plate 100, and thus are recognized as different gestures. Similarly, the gestures b1 and b4 shown in FIG. 10B and the gestures c2 and c1 shown in FIG. 10C are identical in the tracing direction of the finger but different in the traced side of the plate 100, and thus are recognized as different gestures. In this manner, different commands can be input by the tracing actions over different sides in the same direction. Accordingly, up to eight kinds of commands can be input by one-way tracing actions in the four upward, downward, rightward, and leftward tracing directions. Further, the number of commands can be freely increased by using not only a one-way tracing action but also a reciprocation tracing action and a plurality of reciprocation tracing actions, and by using not only tracing actions over one side but also tracing actions over a plurality of sides. Although not shown in FIGS. 10A to 10E, tracing actions over three or more sides of the plate 100 and tracing actions over all the sides of the plate 100 one or more laps may be used.

Figure 12:
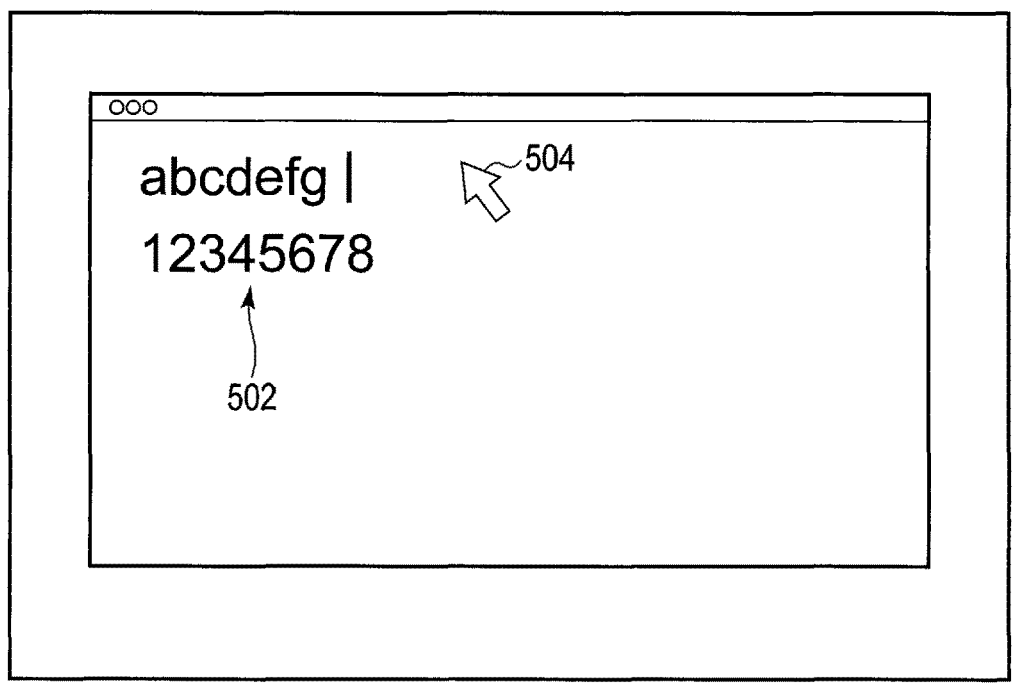
FIG. 12 illustrates an example of the screen of the display device 124 without the screen keyboard 506.
Figure 13:
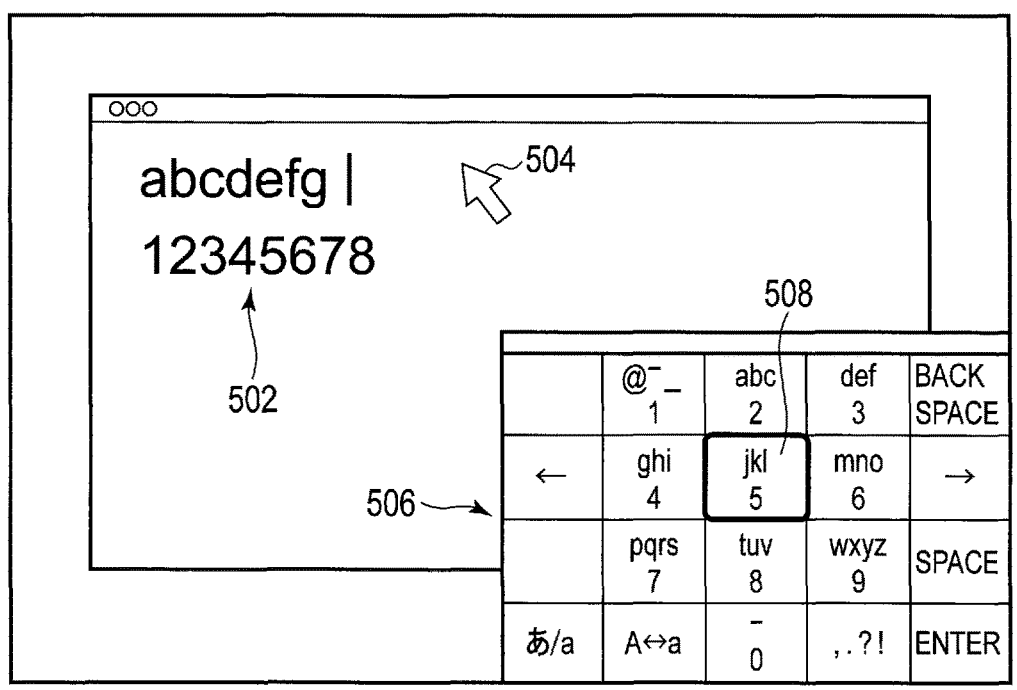
FIG. 13 illustrates an example of the screen of the display device 124 with the screen keyboard 506.

FIGS. 11A and 11B illustrate an example of the correspondences between the gestures shown in FIGS. 10A to 10E and the commands input into the mobile PC 16, that is, the operations of the mobile PC 16. The table representing the correspondences is saved in the wearable device main body 24 (for example, the sensor controller 162) so that the command is provided to the mobile PC 16 in accordance with the detected gesture. According to the embodiment, the screen of the display device 124 may assume a first state without display of a screen keyboard 506 as shown in FIG. 12 and a second state with display of the screen keyboard 506 as shown in FIG. 13. The screen of the display device 124 also displays characters 502. As shown in FIG. 11A, in the first state (see FIG. 12), the touch pad 110 is operated to issue an instruction for the action equivalent to a movement of a mouse cursor 504, a click, a double click, or a press-hold of a right button or a left button of a mouse. As shown in FIG. 11B, in the second state with the display of the screen keyboard 506 (see FIG. 13), the touch pad 110 is operated to issue instructions for the input of characters through the screen keyboard 506 in addition to the instruction in the case of FIG. 12.

When the gesture a1 is detected, the upward movement of the mouse cursor 504 is started or ended. When the gesture a2 is detected, the downward movement of the mouse cursor 504 is started or ended. When the gesture a3 is detected, the leftward movement of the mouse cursor 504 is started or ended. When the gesture a4 is detected, the rightward movement of the mouse cursor 504 is started or ended.

After the start of the movement of the mouse cursor 504 by any of the four gestures a1 to a4 shown in FIG. 10A, the mouse cursor 504 continues movement unless the user releases the finger from the touch pad 110. The movement of the mouse cursor 504 is ended by the user releasing the finger from the touch pad 110.

In this manner, the start and the end of the movement of the mouse cursor 504 can be instructed by tracing once the side of the plate 100 on the touch pad 110 as shown in FIG. 10A. The tracing directions are determined for the sides of the plate 100. For example, the right side s1 (front side of the user's face) of the plate 100 is traced in the upward and the downward directions as shown with the gestures a1 and a2. Furthermore, the upper side s2 of the plate 100 is traced in the rightward and the leftward directions (the forward and the backward directions of the user's face) as shown with the gestures a3 and a4. One side is assigned to the upward and the downward tracing actions, and another side is assigned to the rightward and the leftward tracing actions for the purpose of saving the remaining sides (the left and the lower sides) for other instructions. If there are no other instructions to be assigned, the upward and the downward tracing actions may be respectively assigned to the right and the left sides, and the rightward and the leftward actions may be respectively assigned to the upper and lower sides.

When the gesture b1 is detected, the action equivalent to the click of the left mouse button is performed or the press-hold by the gesture b3 is canceled. When the gesture b2 is detected, the action equivalent to the double click of the left mouse button is performed or the press-hold by the gesture b3 is canceled. When the gesture b3 is detected, the press-hold of the left mouse button is started (lock) or the press-hold by the gesture b3 is canceled (unlock). That is, the gesture b3 issues an instruction for start/cancellation (toggle) of the press-hold of the left mouse button. When the gesture b4 is detected, the action equivalent to the click of the right mouse button is performed.

In this manner, the mouse button operation corresponds to the reciprocation tracing action over the side of the plate 100 on the touch pad 110 as shown in FIG. 10B.

Accordingly, in the state without the display of the screen keyboard 506 (see FIG. 12), the touch pad 110 can be operated to issue an instruction for the action equivalent to the movement of the mouse cursor 504, the click, the double click, or the press-hold of the right button or the left button of the mouse.

The gesture c1 is made to issue an instruction for switching (toggling) between on and off of screen keyboard display. When the gesture c1 is detected while the screen keyboard display is on, the screen keyboard display is turned off. When the gesture c1 is detected while the screen keyboard display is off, the screen keyboard display is turned on.

The gestures a1 to a4 and b1 to b4 for mouse operations shown in FIG. 11A are also effective in the second state with the display of the screen keyboard 506 (see FIG. 13). In the second state with the display of the screen keyboard 506 (see FIG. 13), the gestures c1, c2, d1 to d4, and e1 to e4 are additionally effective for operations related to the screen keyboard 506 shown in FIG. 11B.

When the gesture c2 is detected, the key with focus 508 on the screen keyboard 506 is input. The key input at that time is called "touch input".

In this manner, the on/off switching of display of the screen keyboard 506 and the keyboard touch input can be instructed by one reciprocating action over the side of the plate 100 on the touch pad 110 as shown in FIG. 10C.

The screen keyboard 506 is roughly divided into QWERTY key type with keys corresponding to characters (kana, alphabet, numbers, and symbols) and numeric key type. In the case of the QWERTY-type screen keyboard, when the gesture c2 is detected, the character corresponding to the focused key is input (touch input).

In the embodiment, the numeric key-type screen keyboard 506 is displayed as shown in FIG. 13. In the numeric key-type screen keyboard 506, a plurality of characters is assigned to each key. When the gesture c2 is detected, a predetermined one among the plurality of characters assigned to the focused key is input (touch input). The characters other than the predetermined one among the plurality of characters assigned to the focused key are input by the flick of the touch pad 110. The input by a flick is called "flick input". For example, when the key labeled j, k, l, and 5 has the focus 508, the number "5" is input by touch input, the letters "j", "k" and "l" are input by flick input.

When the gesture d1 is detected, the upward movement of the focus 508 on the screen keyboard 506 (hereinafter, also called "keyboard focus") is started or ended. When the gesture d2 is detected, the downward movement of the keyboard focus 508 is started or ended. When the gesture d3 is detected, the leftward movement of the keyboard focus 508 is started or ended. When the gesture d4 is detected, the rightward movement of the keyboard focus 508 is started or ended.

After the start of the movement of the keyboard focus 508 by any of the four gestures d1 to d4 shown in FIG. 10D, the keyboard focus 508 continues movement unless the user releases the finger from the touch pad 110. The movement of the keyboard focus 508 is ended by the user releasing the finger from the touch pad 110.

The start and the end of the movement of the keyboard focus 508 can be instructed by tracing once the side s3 or s4 of the plate 100 on the touch pad 110 as shown in FIG. 10D.

When the gesture e1 is detected, an upward flick input of the key with the keyboard focus 508 is performed. In the example of FIG. 13, the letter "k" is input. When the gesture e2 is detected, a downward flick input of the key with the keyboard focus 508 is performed. In the example of FIG. 13, nothing is input at this time. When the gesture e3 is detected, a leftward flick input of the key with the keyboard focus 508 is performed. In the example of FIG. 13, the letter "j" is input. When the gesture e4 is detected, a rightward flick input of the key with the keyboard focus 508 is performed. In the example of FIG. 13, the letter "l" is input.

In this manner, the flick input can be instructed by consecutively tracing the two sides of the plate 100 on the touch pad 110 as shown in FIG. 10E.

The movement direction of the mouse cursor 504 and the movement direction of the keyboard focus 508 are instructed by the direction of the finger tracing the touch pad 110. As shown in FIGS. 10A and 10D, the sides of the plate 100 traced to instruct for the movement of the mouse cursor 504 and the sides of the plate 100 traced to instruct for the movement of the keyboard focus 508 are different from each other. Accordingly, the movement of different targets can be instructed by the tracing actions over the different sides in the same direction. As a result, in the state with the display of the screen keyboard 506 (see FIG. 13), it is possible to provide instructions for the movement of the keyboard focus 508, the touch input and the flick input, in addition to the mouse operation by operating the touch pad 110.

Figure 14A:
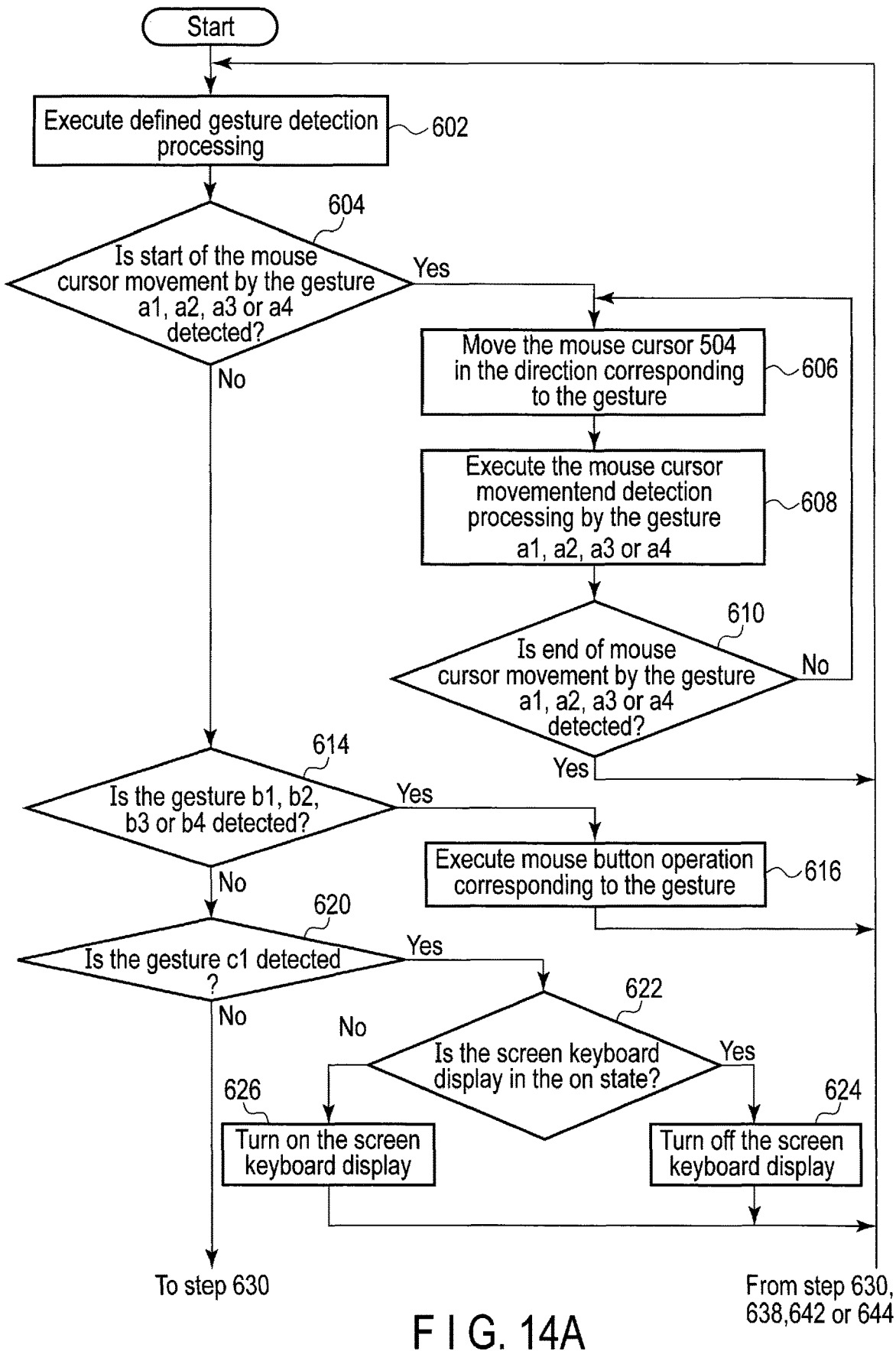
FIG. 14A shows a flowchart of an example of an action of the sensor controller 162 of the wearable device main body 24 executing the foregoing processing.
Figure 14B:
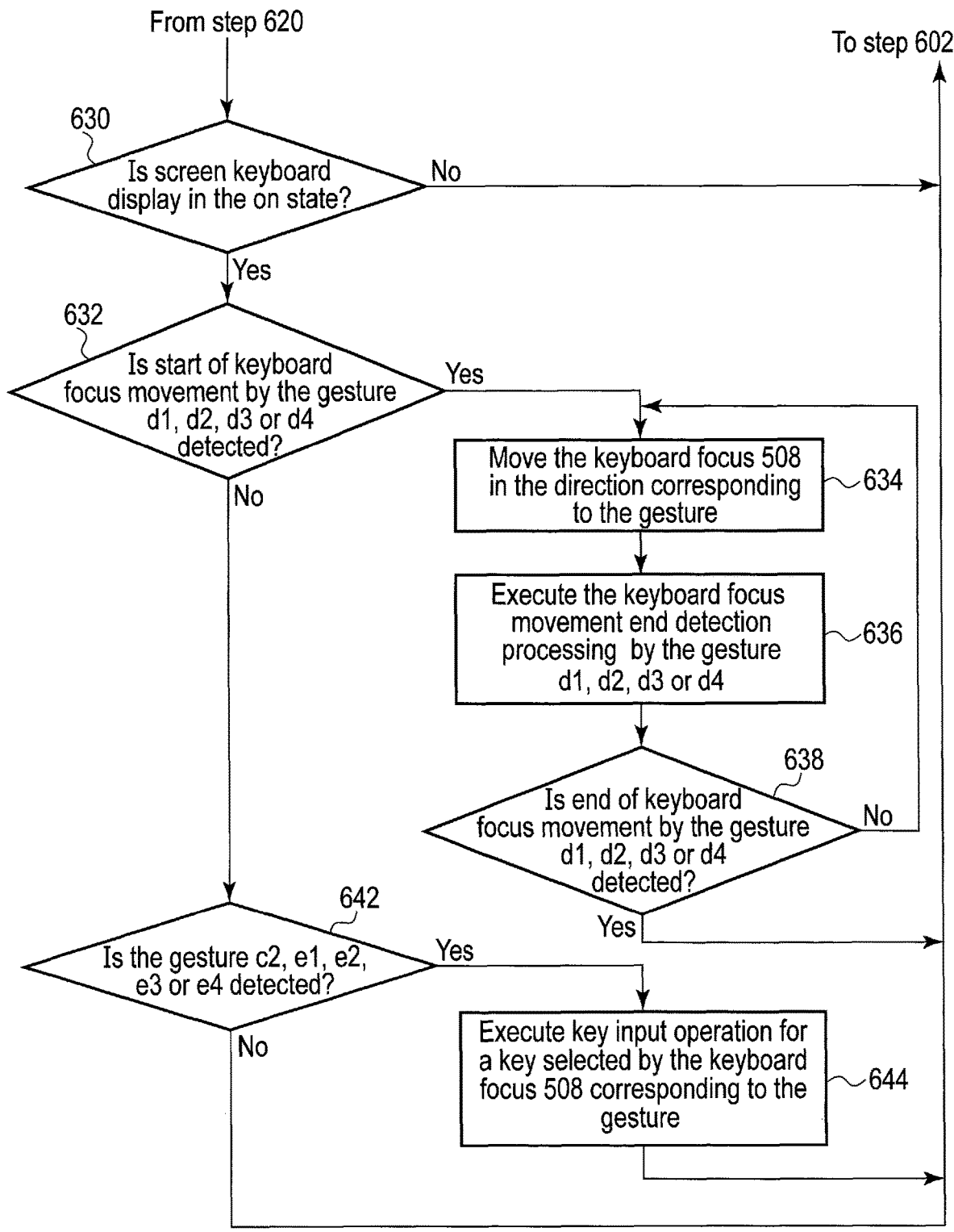
FIG. 14B show a flowchart of an example of an action of the sensor controller 162 of the wearable device main body 24 executing the foregoing processing.

FIGS. 14A and 14B show a flowchart of an example of an action of the sensor controller 162 of the wearable device main body 24 performing the foregoing processing. In step 602, defined gesture detection processing is executed. The defined gesture detection processing refers to processing for detecting the touch of the finger on the plate 100 on the touch pad 110, the movement of the finger in touch with the plate 100, the stop of the movement of the finger, and the release of the finger from the plate 100, determining whether the movement of the finger in touch with the plate 100 corresponds to any of the gestures shown in FIGS. 10A to 10E, and detecting the instructed action.

An example of the defined gesture detection processing is shown in FIG. 15. In step 652, the touch of the finger on the four sides of the plate 100 on the touch pad 110 is detected. In step 654, the start of the movement of the finger over the four sides of the plate 100 is detected. In step 656, the stop of the movement of the finger is detected.

When the stop of the movement of the finger is detected, it is determined in step 658 whether the movement of the finger corresponds to any of the gestures a1 to a4 shown in FIG. 10A and the gestures d1 to d4 shown in FIG. 10D. When it is determined in step 658 that the movement of the finger corresponds to any of the gestures a1 to a4 and d1 to d4, an instruction for the start of the movement of the mouse cursor or the keyboard focus by any of the gestures a1 to a4 and d1 to d4 is detected in step 660. When it is not determined in step 658 that the movement of the finger corresponds to any of the gestures a1 to a4 and d1 to d4, it is then determined in step 662 whether the movement of the finger corresponds to any of the gestures b1 to b4 shown in FIG. 10B, the gestures c1 and c2 shown in FIG. 10C, and the gestures e1 to e4 shown in FIG. 10E. When it is determined in step 662 that the movement of the finger corresponds to any of the gestures b1 to b4, c1, c2, and e1 to e4, the release of the finger from the four sides of the plate 100 is detected in step 664. In step 666, an instruction for the action by any of the gestures b1 to b4, c1, c2, and e1 to e4 is detected in step 666. When it is not determined in step 662 that the movement of the finger corresponds to any of the gestures b1 to b4, c1, c2, and e1 to e4, the processing returns to step 652 to detect the next touch.

Returning to FIG. 14A, the detection result of the defined gesture detection processing is determined, and processing is executed in accordance with the determination result. When it is determined in step 604 that the result of the defined gesture detection is an instruction for the start of movement of the mouse cursor by any of the gestures a1 to a4, the mouse cursor 504 starts to be moved in the direction corresponding to any of the gestures a1 to a4 in step 606. In step 608, mouse cursor movement end detection processing by any of the gestures a1 to a4 is executed.

FIG. 16 illustrates an example of the mouse cursor movement end detection processing (step 608). Referring to FIG. 16, it is detected in step 672 whether the finger is in touch with the plate 100 or is released from the plate 100, and the detection result is determined in step 674. When the detection result is that the finger is released from the plate 100, an instruction for the end of movement of the mouse cursor by any of the gestures a1 to a4 is detected in step 676. When the detection result is that the finger is in touch with the plate 100, an instruction for the continuance of movement of the mouse cursor by any of the gestures a1 to a4 is detected in step 678.

Returning to FIG. 14A, it is determined in step 610 whether an instruction for the end of movement of the mouse cursor by any of the gestures a1 to a4 is detected. When it is not determined in step 610 that an instruction for the end of movement of the mouse cursor is detected, the processing returns to step 606 to continue the movement of the mouse cursor. When it is determined in step 610 that an instruction for the end of movement of the mouse cursor is detected, the processing returns to step 602 to execute the next defined gesture detection processing.

When it is not determined in step 604 that the result of the defined gesture detection is an instruction for the action by any of the gestures a1 to a4, it is then determined in step 614 whether the result of the defined gesture detection is an instruction for the action by any of the gestures b1 to b4. When it is determined in step 614 that the result of the defined gesture detection is an instruction for the action by any of the gestures b1 to b4, the mouse button operation corresponding to any of the gestures b1 to b4 is executed in step 616. After that, the processing returns to step 602 to execute the next defined gesture detection processing.

When it is not determined in step 614 that the result of the defined gesture detection is an instruction for the action by any of the gestures b1 to b4, it is then determined in step 620 whether the result of the defined gesture detection is an instruction for the action by the gesture c1. When it is determined in step 620 that the result of the defined gesture detection is an instruction for the action by the gesture c1, it is then determined in step 622 whether the screen keyboard display is in the on state or the off state. When it is determined in step 622 that the screen keyboard display is in the on state, the screen keyboard display is turned off in step 624. When it is determined in step 622 that the screen keyboard display is in the off state, the screen keyboard display is turned on in step 626. After that, the processing returns to step 602 to execute the next defined gesture detection processing.

When it is not determined in step 620 that the result of the defined gesture detection is an instruction for the action by the gesture c1, it is then determined in step 630 (FIG. 142) whether the screen keyboard display is in the on state or the off state. When it is determined in step 630 that the screen keyboard display is in the off state, the processing returns to step 602 to execute the next defined gesture detection processing.

When it is determined in step 630 that the screen keyboard display is in the on state, it is then determined in step 632 whether the result of the defined gesture detection is an instruction for the start of movement of the keyboard focus by any of the gestures d1 to d4. When it is determined in step 632 that the result of the defined gesture detection is an instruction for the start of movement of the keyboard focus by any of the gestures d1 to d4, the keyboard focus 508 starts to be moved in the direction corresponding to any of the gestures d1 to d4 in step 634. In step 636, keyboard focus movement end detection processing by any of the gestures d1 to d4 is executed.

FIG. 17 illustrates an example of the keyboard focus movement end detection processing (step 636). Referring to FIG. 17, it is detected in step 682 whether the finger is in touch with the plate 100 or is released from the plate 100, and the detection result is determined in step 684. When the detection result is that the finger is released from the plate 100, an instruction for the end of movement of the keyboard focus 508 by any of the gestures d1 to d4 is detected in step 686. When the detection result is that the finger is in touch with the plate 100, an instruction for the continuance of movement of the keyboard focus 508 by any of the gestures d1 to d4 is detected in step 688.

Returning to FIG. 14B, it is determined in step 638 whether an instruction for the end of movement of the keyboard focus 508 by any of the gestures d1 to d4 is detected. When it is not determined in step 638 that an instruction for the end of movement of the keyboard focus 508 is detected, the processing returns to step 634 to continue the movement of the keyboard focus 508. When it is determined in step 638 that an instruction for the end of the movement of the keyboard focus 508 is detected, the processing returns to step 602 to execute the next defined gesture detection processing.

When it is not determined in step 632 that the result of the defined gesture detection is an instruction for the action by any of the gestures d1 to d4, it is then determined in step 642 whether the result of the defined gesture detection is an instruction for the action by any of the gestures c2 and e1 to e4. When it is determined in step 642 that the result of the defined gesture detection is an instruction for the action by any of the gestures c2 and e1 to e4, the key input operation corresponding to any of the gestures c2 and e1 to e4 is executed in step 644. After that, the processing returns to step 602 to execute the next defined gesture detection processing. When it is not determined in step 642 that the result of the defined gesture detection is an instruction for the action by any of the gestures c2 and e1 to e4, the processing returns to step 602 to execute the next defined gesture detection processing.

As described above, according to the embodiment, the touch pad 110 has the stepped plate 100 and is configured such that various commands can be input by tracing the sides of the plate 100 with the finger. This allows the user to move a finger on the touch pad 110 in predetermined directions to input commands appropriately. Accordingly, when the touch pad 110 according to the embodiment is applied to a small-sized touch pad on the side of a wearable device attached to the user's head, the user can input correct commands even gropingly. In addition, the user is supposed to make limited kinds of gestures by moving a finger in the only four upward, downward, rightward, and leftward directions. The user thus needs to memorize only a small number of gestures for command input. Accordingly, the user can memorize easily the gestures corresponding to the instructions of commands.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wearable device comprising:
   a display that displays a screen keyboard on a screen when an instruction is input;
   a touch pad that comprises a polygonal plate and detectors;
   a sensor controller electrically connected to the detectors, the sensor controller detecting a tracing action of a finger based only on detection results of at least a plurality of detectors that is provided on one or more side edges of the polygonal plate; and
   a hardware processor that executes an action on the screen in accordance with the detected tracing action when the screen keyboard is displayed on the screen.

2. The wearable device according to claim 1, wherein the sensor controller detects a tracing direction of the finger along at least one of the side edges, and
   the hardware processor moves a mouse cursor in a direction corresponding to the tracing direction detected by the sensor controller.

3. The wearable device according to claim 1, wherein the sensor controller detects a tracing direction of the finger along a first side edge or a second side edge of the polygonal plate, the first side edge intersecting the second side edge, and
   the hardware processor
      starts moving a mouse cursor in a direction corresponding to the tracing direction detected by the sensor controller when the sensor controller detects a start of the tracing action of the finger along the first side edge,
      stops moving of the mouse cursor when the sensor controller detects an end of the tracing action of the finger along the first side edge,
      starts moving the mouse cursor in the direction corresponding to the tracing direction detected by the sensor controller when the sensor controller detects a start of the tracing action of the finger along the second side edge, and
      stops moving of the mouse cursor when the sensor controller detects an end of the tracing action of the finger along the second side edge.

4. The wearable device according to claim 3, wherein the sensor controller detects a tracing direction of the finger along at least one of a third side edge and a fourth side edge of the polygonal plate, the third side edge being parallel with the first side edge and the fourth side edge being parallel with the second side edge, and
   the hardware processor does not
      start moving the mouse cursor in the direction corresponding to the tracing direction detected by the sensor controller when the sensor controller detects a start of the tracing action of the finger along the third side edge, and
      start moving the mouse cursor in the direction corresponding to the tracing direction detected by the sensor controller when the sensor controller detects a start of the tracing action of the finger along the fourth side edge.

5. The wearable device according to claim 1, wherein the sensor controller detects a tracing direction of the finger along at least one of the side edges, and
   the hardware processor moves a focused key on the screen keyboard in a direction corresponding to the tracing direction detected by the sensor controller when the hardware processor determines that the screen keyboard is displayed.

6. The wearable device according to claim 1, wherein the sensor controller detects a tracing direction of the finger along a first side edge of the polygonal plate and a second side edge of the polygonal plate, the first side edge intersecting the second side edge, and
   when the hardware processor determines that the screen keyboard is displayed,
   the hardware processor
      starts moving a focused key on the screen keyboard in a direction corresponding to the tracing direction detected by the sensor controller when the sensor controller detects a start of the tracing action of the finger along the first side edge,
stops moving of the focused key on the screen keyboard when the sensor controller detects an end of the tracing action of the finger along the first side edge,
starts moving the focused key on the screen keyboard in the direction corresponding to the tracing direction detected by the sensor controller when the sensor controller detects a start of the tracing action of the finger along the second side edge, and
stops moving of the focused key on the screen keyboard when the sensor controller detects an end of the tracing action of the finger along the second side edge.

7. The wearable device according to claim 6, wherein the sensor controller detects the tracing direction of the finger along a third side edge or a fourth side edge of the polygonal plate, the third side edge being parallel with the first side edge and the fourth side edge being parallel with the second side edge, and
when the hardware processor determines that the screen keyboard is displayed,
the hardware processor does not
start moving the focused key on the screen keyboard in the direction corresponding to the tracing direction detected by the sensor controller when the sensor controller detects a start of the tracing action of the finger along the third side edge, and
start moving of the focused key on the screen keyboard in the direction corresponding to the tracing direction detected by the sensor controller when the sensor controller detects a start of the tracing action of the finger along the fourth side edge.

8. The wearable device according to claim 1, wherein the sensor controller detects a touch of the finger on at least one of the side edges or a tracing direction of the finger along at least one of the side edges,
a key of the screen keyboard comprises a first character and a plurality of second characters, and
when the hardware processor determines that the screen keyboard is displayed,
the hardware processor
inputs the first character when the sensor controller detects the touch of the finger based on detection results of the detectors, and
inputs one of the second characters based on the tracing direction detected by the sensor controller when the sensor controller detects the tracing direction of the finger based only on detection results of at least a plurality of detectors that is provided on one or more edges of polygonal plates.

9. The wearable device according to claim 1, wherein the polygonal plate comprises a square plate, a rectangular plate, a square plate with round corners, or a rectangular plate with round corners.

10. The wearable device according to claim 1, wherein the wearable device comprises an eye glasses-shaped housing,
the display is attached to the housing so as to be positioned on a line of sight of a user wearing the housing, and
the detectors are attached to the housing such that the plate is positioned on a side of a head of the user wearing the housing.

11. The wearable device according to claim 1, wherein the polygonal plate is formed on a center of the touch pad.

12. The wearable device according to claim 1, wherein when the display displays a mouse on the screen, the hardware processor selectively executes one of a first action and a second action on the screen in accordance with the tracing action, the first action regarding the mouse cursor, and the second action regarding the screen keyboard.

13. The wearable device according to claim 12, wherein the hardware processor executes the first action in accordance with a first tracing action of the finger, and the hardware processor executes the second action in accordance with a second tracing action of the finger.

14. A wearable device comprising:
a display that displays a screen keyboard on a screen when an instruction is input;
a detector that comprises a polygonal plate and a plurality of detecting portions;
a sensor controller communicably connected to the detector, the sensor controller detecting a tracing action based only on detection results of at least a plurality of detecting portions that is provided on one or more edges of the polygonal plate; and
a hardware processor that determines whether the screen keyboard is displayed on the screen when sensor controller detects the tracing action, and executes an action on the screen in accordance with the tracing action detected by the sensor controller when the hardware processor determines that the screen keyboard is displayed, wherein the hardware processor
executes an action corresponding to a click of a left mouse button on the screen when the sensor controller detects a first tracing action of the finger,
executes an action corresponding to a double-click of the left mouse button on the screen when the sensor controller detects a second tracing action of the finger,
executes an action corresponding to a start of a press-hold of the left mouse button on the screen when the sensor controller detects a third tracing action of the finger,
executes an action corresponding to a click of a right mouse button on the screen when the sensor controller detects a fourth tracing action of the finger, and
executes an action corresponding to an end of the press-hold of the left mouse button on the screen when the sensor controller detects a fifth tracing action of the finger.

15. The wearable device according to claim 14, wherein the hardware processor displays the screen keyboard on the screen or turns off the screen keyboard on the screen when the sensor controller detects a sixth tracing action of the finger.

16. The wearable device according to claim 15, wherein the hardware processor inputs a character corresponding to a focused key on the screen keyboard when the sensor controller detects a seventh tracing action of the finger and when the hardware processor determines that the screen keyboard is displayed.

17. An operation method of a wearable device comprising a display that displays a screen keyboard on a screen when an instruction is input, and a touch pad that comprises a polygonal plate and detectors, and a sensor controller for detecting a tracing action of a finger based only on detection results of at least a plurality of detectors that is provided on one or more side edges of the polygonal plate, the method comprising:

determining whether the screen keyboard is displayed on the screen when the detector detects the tracing action; and executing an action on the screen in accordance with the tracing action detected by the detector when it is determined that the screen keyboard is displayed.

* * * * *